United States Patent
Faitelson et al.

(10) Patent No.: US 9,286,316 B2
(45) Date of Patent: Mar. 15, 2016

(54) ENTERPRISE LEVEL DATA COLLECTION SYSTEMS AND METHODOLOGIES

(75) Inventors: Yakov Faitelson, Elkana (IL); Ohad Korkus, Herzeliya (IL); David Bass, Carmei Yoseph (IL); Yzhar Kaysar, Kohav Yair (IL)

(73) Assignee: VARONIS SYSTEMS, INC., New York, NY (US)

( * ) Notice: Subject to any disclaimer, the term of this patent is extended or adjusted under 35 U.S.C. 154(b) by 0 days.

(21) Appl. No.: 13/439,276

(22) Filed: Apr. 4, 2012

(65) Prior Publication Data

US 2013/0268650 A1  Oct. 10, 2013

(51) Int. Cl.
*G06F 15/173* (2006.01)
*G06F 7/00* (2006.01)
*G06F 17/30* (2006.01)
*H04L 29/08* (2006.01)

(52) U.S. Cl.
CPC .... *G06F 17/30194* (2013.01); *G06F 17/30566* (2013.01); *G06F 17/30575* (2013.01); *H04L 67/1004* (2013.01)

(58) Field of Classification Search
CPC .............................. H04L 49/254; H04L 49/50
USPC ........................................................ 709/224
See application file for complete search history.

(56) References Cited

U.S. PATENT DOCUMENTS

| | | | |
|---|---|---|---|
| 6,418,445 B1 | 7/2002 | Moerbeek | |
| 6,574,630 B1 | 6/2003 | Augustine et al. | |
| 6,701,324 B1 * | 3/2004 | Cochran | G06F 17/30545 707/752 |
| 7,107,340 B2 | 9/2006 | Chkodrov et al. | |
| 7,444,655 B2 | 10/2008 | Sardera | |
| 7,555,482 B2 | 6/2009 | Korkus | |
| 7,596,571 B2 | 9/2009 | Sifry | |
| 7,606,801 B2 | 10/2009 | Faitelson et al. | |
| 8,078,653 B1 | 12/2011 | Bisson et al. | |
| 8,082,347 B2 | 12/2011 | Abdelhamid et al. | |
| 2002/0144142 A1 | 10/2002 | Shohat | |

(Continued)

FOREIGN PATENT DOCUMENTS

EP  1 248 178 B1  1/2004

OTHER PUBLICATIONS

International Search Report and Written Opinion dated Aug. 17, 2012, issued during the prosecution of Applicant's PCT/IL2012/000153.

(Continued)

*Primary Examiner* — Kevin Bates
*Assistant Examiner* — Emad Siddiqi
(74) *Attorney, Agent, or Firm* — Ladas & Parry LLP

(57) ABSTRACT

An enterprise data collection system including at least one database for receiving over a network and storing data collected from data resources at a plurality of physical sites located at disparate locations, a plurality of remotely synchronizable probes (RSPs) located at the plurality of physical sites, the remotely synchronizable probes (RSPs) performing at least one of the following data collection functions: real time event collection, file system crawling for data structure and permissions, data content analysis, data indexing, data tagging and event triggered alerts, and at least one RSP manager located remotely from at least one of the plurality of remotely synchronizable probes and being operative to govern the operation of and orchestrate data collection and transmission by the plurality of remotely synchronizable probes (RSPs).

32 Claims, 18 Drawing Sheets

(56) References Cited

U.S. PATENT DOCUMENTS

| | | | |
|---|---|---|---|
| 2003/0153991 A1* | 8/2003 | Visser | G06Q 10/10 700/79 |
| 2004/0123183 A1 | 6/2004 | Tripathi et al. | |
| 2007/0244899 A1 | 10/2007 | Faitelson et al. | |
| 2008/0115076 A1 | 5/2008 | Frank et al. | |
| 2008/0172720 A1 | 7/2008 | Botz et al. | |
| 2008/0271157 A1 | 10/2008 | Faitelson et al. | |
| 2009/0100058 A1 | 4/2009 | Faitelson et al. | |
| 2009/0119298 A1 | 5/2009 | Faitelson et al. | |
| 2009/0150981 A1 | 6/2009 | Amies et al. | |
| 2009/0265780 A1 | 10/2009 | Korkus et al. | |
| 2010/0179940 A1* | 7/2010 | Gilder et al. | 707/622 |
| 2011/0010758 A1 | 1/2011 | Faitelson et al. | |
| 2011/0060916 A1 | 3/2011 | Faitelson et al. | |
| 2011/0061093 A1 | 3/2011 | Korkus et al. | |
| 2011/0061111 A1 | 3/2011 | Faitelson et al. | |
| 2011/0153368 A1 | 6/2011 | Pierre et al. | |
| 2011/0184989 A1 | 7/2011 | Faitelson et al. | |
| 2011/0296490 A1 | 12/2011 | Faitelson et al. | |
| 2012/0016954 A1 | 1/2012 | Andersen et al. | |
| 2012/0054283 A1 | 3/2012 | Korkus et al. | |
| 2012/0084595 A1* | 4/2012 | Dutch et al. | 714/2 |
| 2012/0215780 A1* | 8/2012 | Faitelson | G06F 17/30693 707/737 |
| 2012/0221550 A1* | 8/2012 | Korkus | G06F 21/6218 707/722 |
| 2013/0227352 A1 | 8/2013 | Kumarasamy et al. | |
| 2013/0246477 A1 | 9/2013 | Faitelson et al. | |

OTHER PUBLICATIONS

USPTO NFOA mailed Sep. 14, 2012 in connection with U.S. Appl. No. 12/861,967.

An English Translation of an Office Action dated Sep. 14, 2012, which issued during the prosecution of German Patent Application No. 11 2006 001 378.5.

Weippl et al., Content-Based Management of Documents Access Control 14th International Conference on Applications of Prolog (INAP), Oct. 20-22, 2001, 9 pages.

An Office Action dated Mar. 24, 2014, which issued during the prosecution of U.S. Appl. No. 13/439,258.

International Search Report dated Sep. 21, 2012; PCT/IL2012/000147.

An Office Action dated Jan. 16, 2015, which issued during the prosecution of U.S. Appl. No. 13/439,258.

Supplementary European Search Report dated Oct. 27, 2015 which issued during the prosecution of Applicant's European App No. 12873565.

Andrew W Leung Minglong Shao Timothy Bisson Shankar Pasupathy Ethan L Miller University of California et al: "Spyglass: Fast, Scalable Metadata Search for Large-Scale Storage Systems", USENIX, Feb. 2, 2009, pp. 1-14.

* cited by examiner

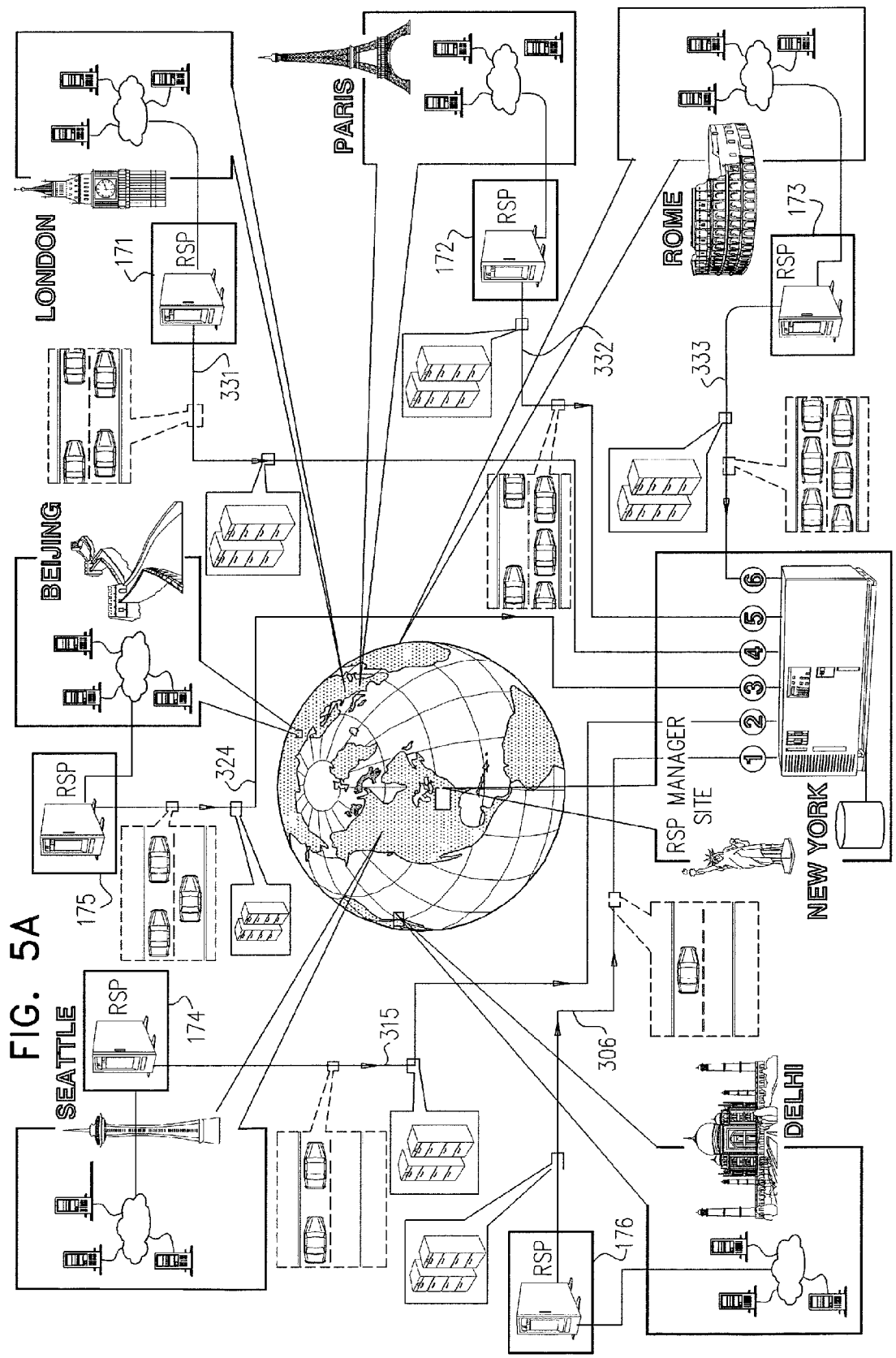

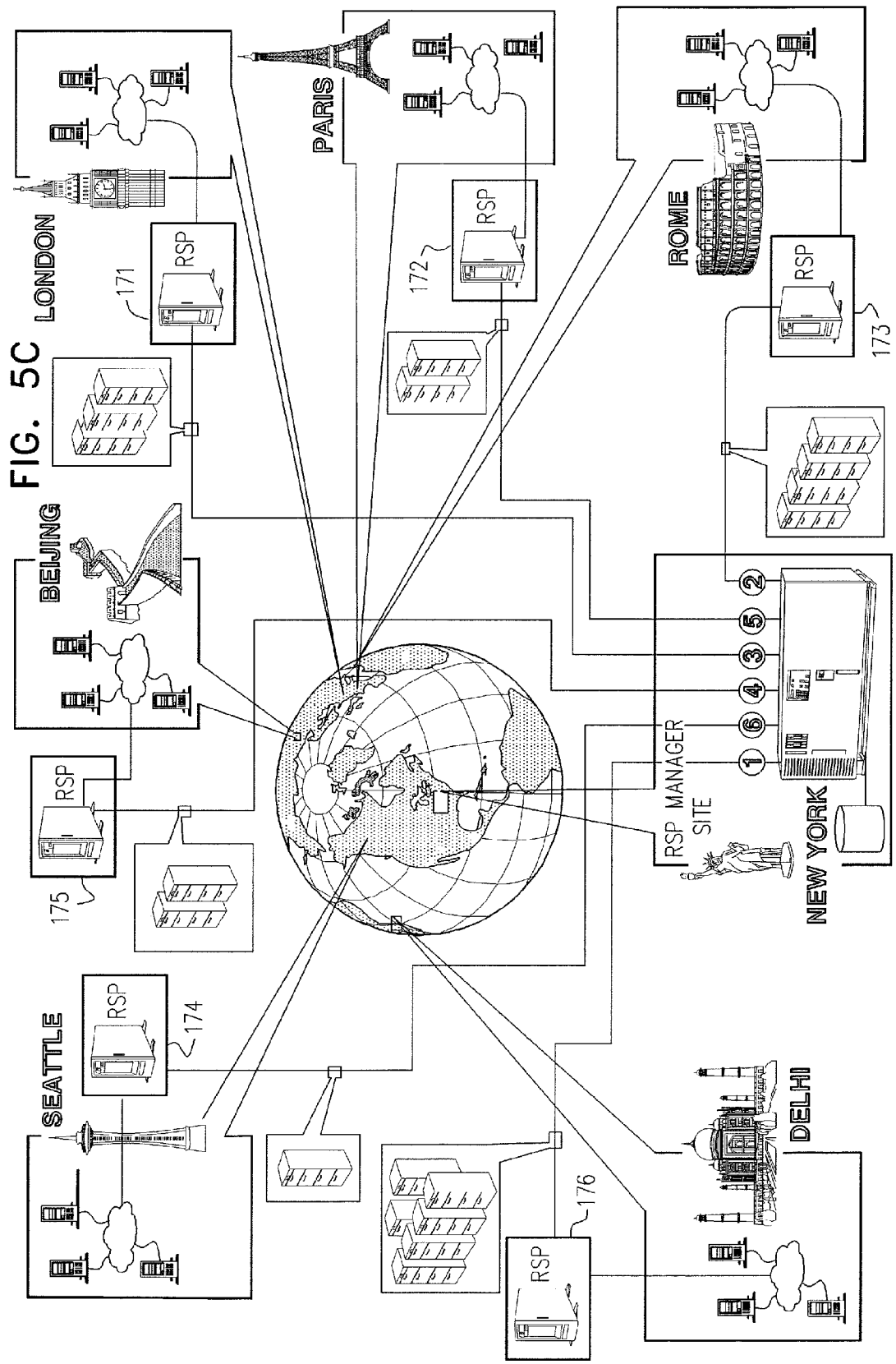

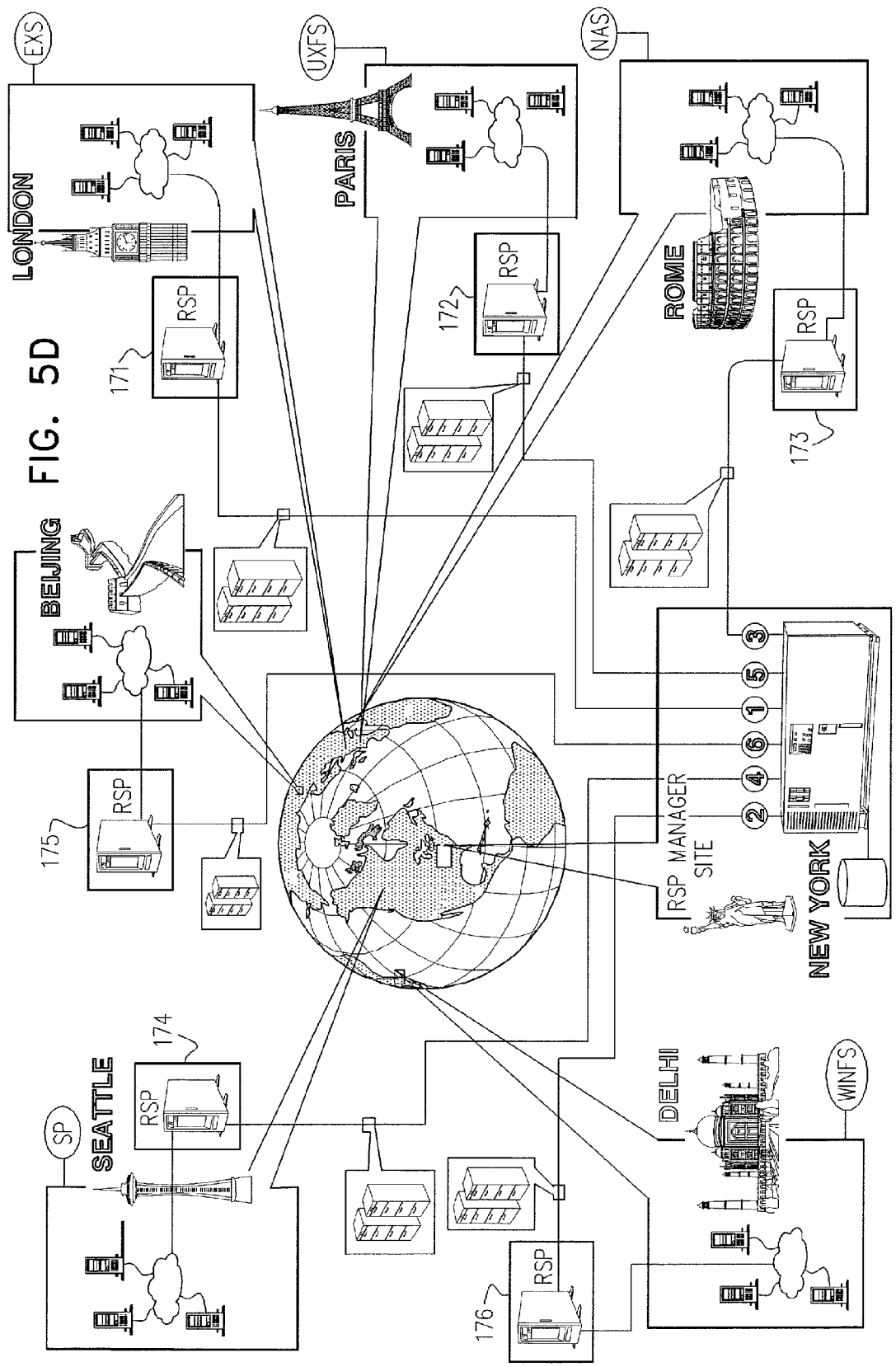

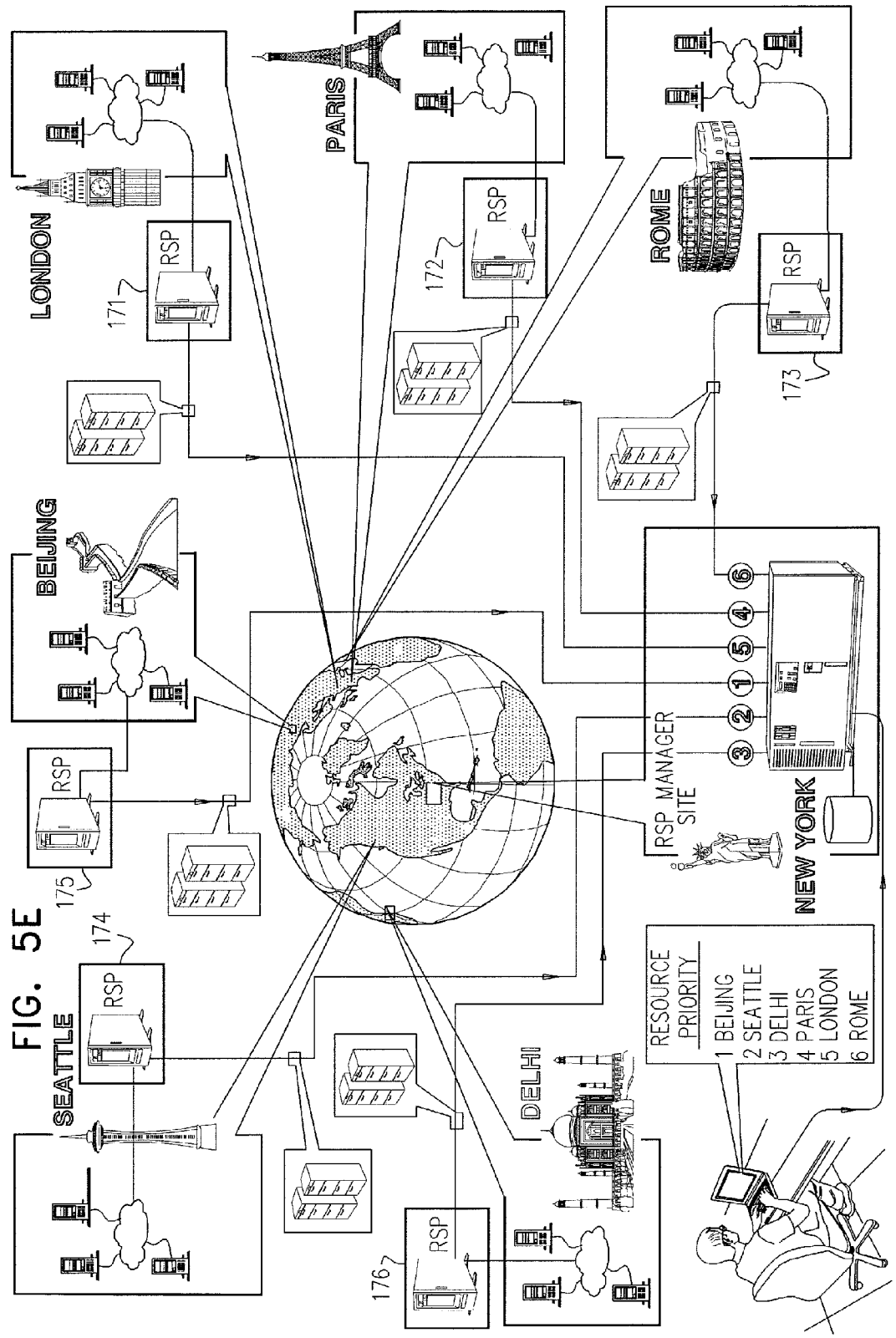

ENTERPRISE LEVEL DATA COLLECTION SYSTEMS AND METHODOLOGIES

REFERENCE TO RELATED APPLICATIONS

Reference is made to the following patents and patent applications, owned by assignee, the disclosures of which are hereby incorporated by reference:

U.S. Pat. Nos. 7,555,482 and 7,606,801;

U.S. Published Patent Application Nos. 2007/0244899, 2008/0271157, 2009/0100058, 2009/0119298; 2009/0265780; 2011/0010758; 2011/0060916; 2011/0061093, 2011/0061111, 2011/0184989, 2011/0296490 and 2012/0054283; and U.S. patent application Ser. Nos. 13/106,023; 13/159,903; and 13/303,826.

FIELD OF THE INVENTION

The present invention relates generally to enterprise level data collection.

BACKGROUND OF THE INVENTION

The following publications are believed to represent the current state of the art:

U.S. Pat. Nos. 7,555,482 and 7,606,801; and

U.S. Published Patent Application No. 2011/0060916.

SUMMARY OF THE INVENTION

The present invention seeks to provide an efficient system and methodology for enterprise level data collection.

There is thus provided in accordance with a preferred embodiment of the present invention an enterprise data collection system including at least one database for receiving over a network and storing data collected from data resources at a plurality of physical sites located at disparate locations, a plurality of remotely synchronizable probes (RSPs) located at the plurality of physical sites, the remotely synchronizable probes (RSPs) performing at least one of the following data collection functions: real time event collection, file system crawling for data structure and permissions, data content analysis, data indexing, data tagging and event triggered alerts, and at least one RSP manager located remotely from at least one of the plurality of remotely synchronizable probes and being operative to govern the operation of and orchestrate data collection and transmission by the plurality of remotely synchronizable probes (RSPs).

Preferably, the at least one RSP coordinates the timing of at least some data collection functions carried out on multiple ones of the data resources, which functions may occur simultaneously. Preferably, the at least one RSP manager coordinates the timing of data collection by multiple ones of the plurality of RSPs on the basis of at least one of the following criteria: network latency, network bandwidth, time of day/day of week at the RSP, size of data resource, type of data resource, prioritization of certain data resources over other data resources and user defined prioritization of data resources.

Preferably, the prioritization of certain data resources over other data resources is based at least partially on characteristics of at least one of: real time event collection, file system crawling for data structure and permissions, data content analysis, data indexing, data tagging and event triggered alerts. Preferably, the at least one RSP manager coordinates the timing of data transmission from multiple ones of the plurality of RSPs, which transmission may occur simultaneously.

Preferably, the at least one RSP manager coordinates the timing of data transmission from multiple ones of the plurality of RSPs on the basis of at least one of the following criteria: network latency, network bandwidth, time of day/day of week at the RSP, time of day/day of week at the at least one database, amount of data to be transmitted, prioritization of certain RSPs over other RSPs and user defined prioritization of data resources.

Preferably, the prioritization of certain RSPs over other RSPs is based at least partially on characteristics of at least one of: real time event collection, file system crawling for data structure and permissions, data content analysis, data indexing, data tagging and event triggered alerts.

There is also provided in accordance with another preferred embodiment of the present invention an enterprise data collection method including transmitting and receiving over a network and storing data collected from data resources at a plurality of physical sites located at disparate locations, performing at the plurality of physical sites at least one of the following data collection functions: real time event collection, file system crawling for data structure and permissions, data content analysis, data indexing, data tagging and event triggered alerts, and governing and orchestrating data collection at the plurality of physical sites and transmission and receiving of the data over the network.

Preferably, the method also includes coordinating the timing of at least some data collection functions carried out on multiple ones of the data resources, which functions may occur simultaneously. Preferably, the coordinating includes coordinating the timing of data collection from data resources at the plurality of physical sites on the basis of at least one of the following criteria: network latency, network bandwidth, time of day/day of week at the physical site, size of data resource, type of data resource, prioritization of certain data resources over other data resources and user defined prioritization of data resources.

Preferably, the prioritization of certain data resources over other data resources is based at least partially on characteristics of at least one of real time event collection, file system crawling for data structure and permissions, data content analysis, data indexing, data tagging and event triggered alerts.

Preferably, the method also includes coordinating the timing of data transmission from multiple ones of the plurality of physical sites which transmission may occur simultaneously.

Preferably, the coordinating the timing of data transmission from multiple ones of the plurality of physical sites is on the basis of at least one of the following criteria: network latency, network bandwidth, time of day/day of week at the physical site, time of day/day of week at the at least one database, amount of data to be transmitted, prioritization of certain physical sites over other physical sites and user defined prioritization of data resources.

Preferably, the prioritization of certain physical sites over other physical sites is based at least partially on characteristics of at least one of real time event collection, file system crawling for data structure and permissions, data content analysis, data indexing, data tagging and event triggered alerts.

BRIEF DESCRIPTION OF THE DRAWINGS

The present invention will be understood and appreciated more fully from the following detailed description, taken in conjunction with the drawings in which:

FIG. 5A is a simplified illustration of part of the system and methodology illustrated in FIG. 1 and FIG. 2, showing coordination of the timing of data transmission by multiple ones of said plurality of RSPs on the basis of network latency;

FIG. 5C is a simplified illustration of part of the system and methodology illustrated in FIG. 1 and FIG. 2, showing coordination of the timing of data transmission by multiple ones of said plurality of RSPs on the basis of the amount of collected data to be transmitted;

FIG. 5D is a simplified illustration of part of the system and methodology illustrated in FIG. 1 and FIG. 2, showing coordination of the timing of data transmission by multiple ones of said plurality of RSPs on the basis of type of data resource;

FIG. 5E is a simplified illustration of part of the system and methodology illustrated in FIG. 1 and FIG. 2, showing coordination of the timing of data transmission by multiple ones of said plurality of RSPs on the basis of user defined prioritization of RSPs located in various physical sites;

DETAILED DESCRIPTION OF PREFERRED EMBODIMENTS

Figure 1:
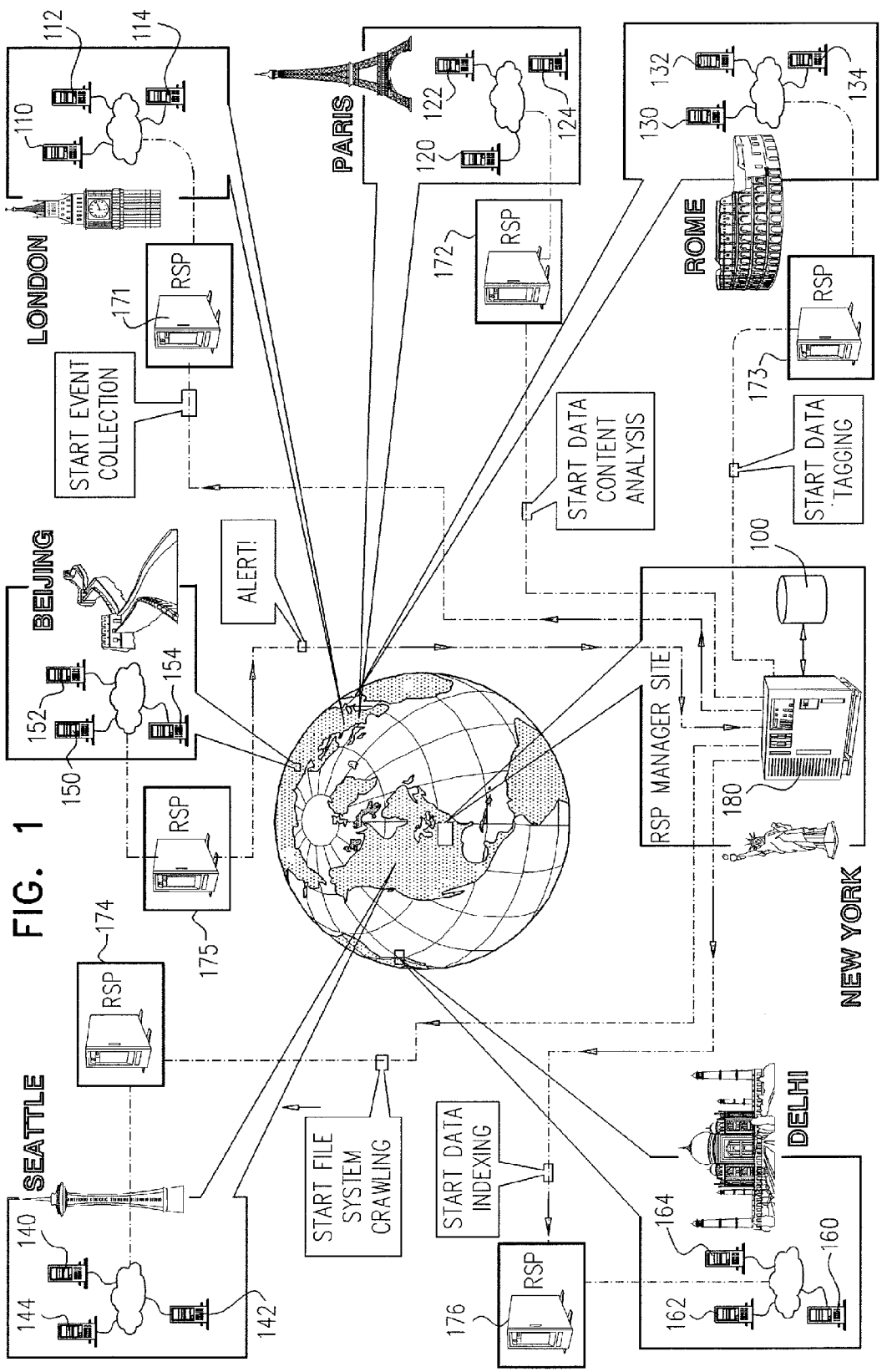
FIG. 1 is a simplified illustration of a system and methodology for enterprise level data collection at a plurality of physical sites located at disparate locations including real time event collection, file system crawling for data structure and permissions, data content analysis, data indexing, data tagging and event triggered alerts.

Reference is now made to FIG. 1, which is a simplified illustration of a system and methodology for enterprise level data collection at a plurality of physical sites located at disparate locations including real time event collection, file system crawling for data structure and permissions, data content analysis, data indexing, data tagging and event triggered alerts.

As seen in FIG. 1, there is provided a system for enterprise level data collection at a plurality of physical sites located at disparate locations including real time event collection, file system crawling for data structure and permissions, data content analysis, data indexing, data tagging and event triggered alerts. The system of FIG. 1 preferably includes at least one database for receiving over a network and storing data collected from data resources at a plurality of physical sites located at disparate locations.

In the illustrated embodiment, a single database 100 is shown, it being appreciated that alternatively a plurality of databases 100 may be provided. The network may be any suitable network such a conventional enterprise wide network including disparately located database systems, servers, routers, computers and other network devices. The data resources may be any suitable data resources such as file systems, databases, NAS devices, WINDOWS®/UNIX® file servers, MICROSOFT® SHAREPOINT® servers and Exchange servers, ERP systems and CRM systems. In the illustrated embodiment, data resources 110, 112 and 114 are shown located in London, data resources 120, 122 and 124 are shown located in Paris and data resources 130, 132 and 134 are shown located in Rome. Data resources 140, 142 and 144 are shown located in Seattle and data resources 150, 152 and 154 are shown located in Beijing. Data resources 160, 162 and 164 are shown located in Delhi.

In accordance with a preferred embodiment of the present invention, a plurality of remotely synchronizable probes (RSPs) are located at the plurality of physical sites. In the illustrated embodiment, RSPs 171, 172 and 173 are located in London, Paris and Rome respectively, RSPs 174 and 175 are located in Seattle and Beijing respectively and RSP 176 is located in Delhi.

In accordance with a preferred embodiment of the invention, remotely synchronizable probes (RSPs) 171-176 each perform at least one of the following data collection functions:
real time event collection;
file system crawling for data structure and permissions;
data content analysis;
data indexing;
data tagging; and
event triggered alerts.

Further in accordance with a preferred embodiment of the present invention, at least one RSP manager, located remotely from at least one of the plurality of remotely synchronizable probes, is operative to govern the operation of and orchestrate data collection and transmission by the plurality of remotely synchronizable probes (RSPs). In the illustrated embodiment, a single RSP manager 180, typically a server, is located at an RSP Manager Site in New York, which also houses database 100. The RSP manager 180 governs the operation of and orchestrates data collection and transmission by remotely synchronizable probes (RSPs) 171-176, which are located in disparate locations geographically distant therefrom.

As seen in FIG. 1, RSP manager 180 sends out various types of instructions to RSPs 171-176. In the illustrated example, RSP manager 180 sends a Start Event Collection instruction to RSP 171 in London, a Start Data Content Analysis instruction to RSP 172 in Paris and a Start Data Tagging instruction to RSP 173 in Rome. The RSP manager 180 typically also sends a Start File System Crawling instruction to RSP 174 in Seattle, receives an Alert from RSP 175 in Beijing and sends a Start Data Indexing instruction to RSP 176 in Delhi.

Figure 2:
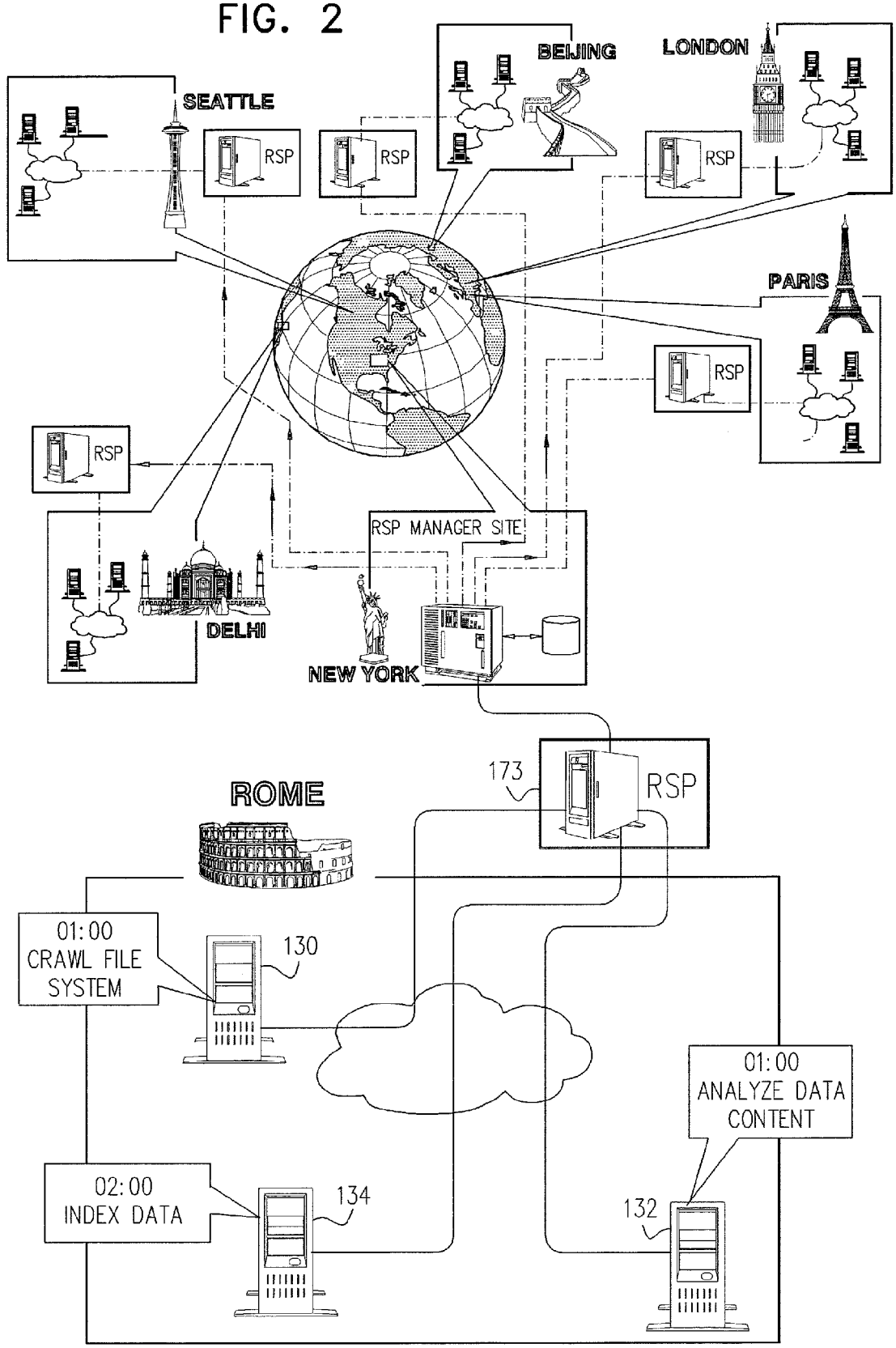
FIG. 2 is a simplified illustration of part of the system and methodology illustrated in FIG. 1, showing coordination of the timing of at least some of the data collection from multiple data resources at one of the plurality of physical sites.

Reference is now made to FIG. 2, which is a simplified illustration of part of the system and methodology illustrated in FIG. 1, showing coordination of the timing of at least some of the data collection from multiple data resources at one of the plurality of physical sites. As seen in FIG. 2, RSP 173 located in Rome coordinates the timing of at least some data collection functions carried out by multiple ones of data resources monitored thereby, which functions may occur simultaneously. For example, as shown in FIG. 2, RSP 173 instructs file servers 130, 132 and 134 monitored thereby to perform various data collection functions at specific times. As shown specifically in FIG. 2, at 01:00 hours, RSP 173 instructs file server 130 to crawl a file system located thereon. Simultaneously, RSP 173 also instructs file server 132 to analyze the data content thereof. At 02:00 RSP 173 instructs file server 134 to index the data stored thereon.

Figure 3A:
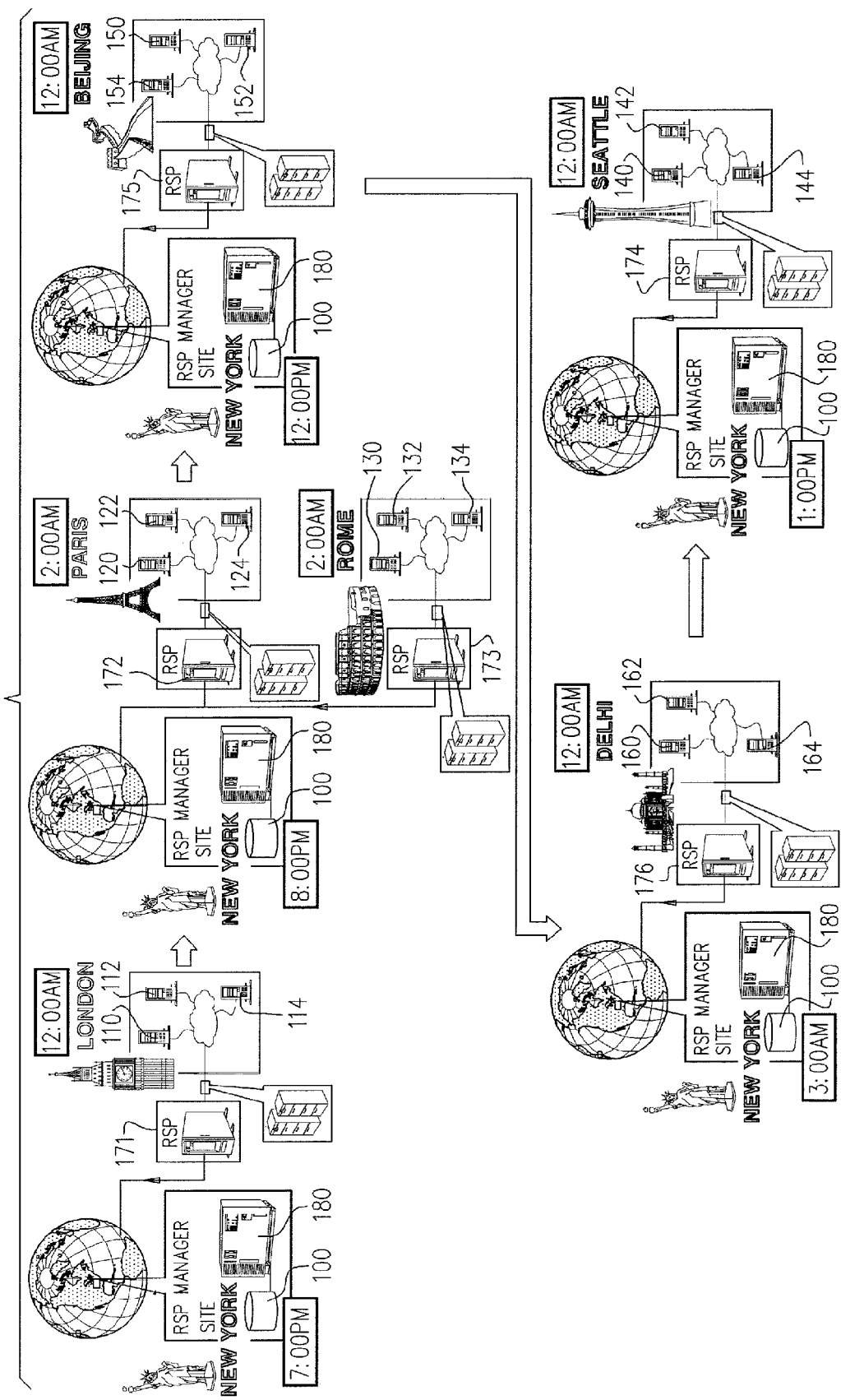
FIG. 3A is a simplified illustration of part of the system and methodology illustrated in FIG. 1 and FIG. 2, showing coordination of the timing of data collection by multiple ones of said plurality of RSPs on the basis of time of day/day of week at the RSP.

Reference is now made to FIG. 3A, which is a simplified illustration of part of the system and methodology illustrated in FIG. 1 and FIG. 2, showing coordination of the timing of data collection by multiple ones of said plurality of RSPs on the basis of time of day/day of week at the RSP. In the example of FIG. 3A, a management rule is implemented by RSP Manager 180 whereby RSPs are instructed to collect data from their respective data resources at times when those data resources have low utilization rates, such as during the local nighttime hours thereat.

Implementation of this rule in the context of an embodiment of the present invention is shown in FIG. 3A as follows: At 12:00 midnight local London time, RSP Manager 180 instructs RSP 171 located in London to collect data from servers 110, 112 and 114 monitored thereby. Thereafter, at 2:00 AM local Paris time RSP Manager 180 instructs RSP 172 located in Paris to collect data from servers 120, 122 and 124 monitored thereby. Simultaneously, at 2:00 AM local Rome time RSP Manager 180 instructs RSP 130 located in Rome to collect data from servers 130, 132 and 134 monitored thereby.

Thereafter, at 12:00 midnight the next day local Beijing time, RSP Manager 180 instructs RSP 175 located in Beijing to collect data from servers 150, 152 and 154 monitored thereby. Thereafter, at 12:00 midnight local Delhi time RSP Manager 180 instructs RSP 160 located in Delhi to collect data from servers 160, 162 and 164 monitored thereby. Thereafter, at 12:00 midnight local Seattle time RSP Manager 180 instructs RSP 174 located in Seattle to collect data from servers 140, 142 and 144 monitored thereby.

Figure 3B:
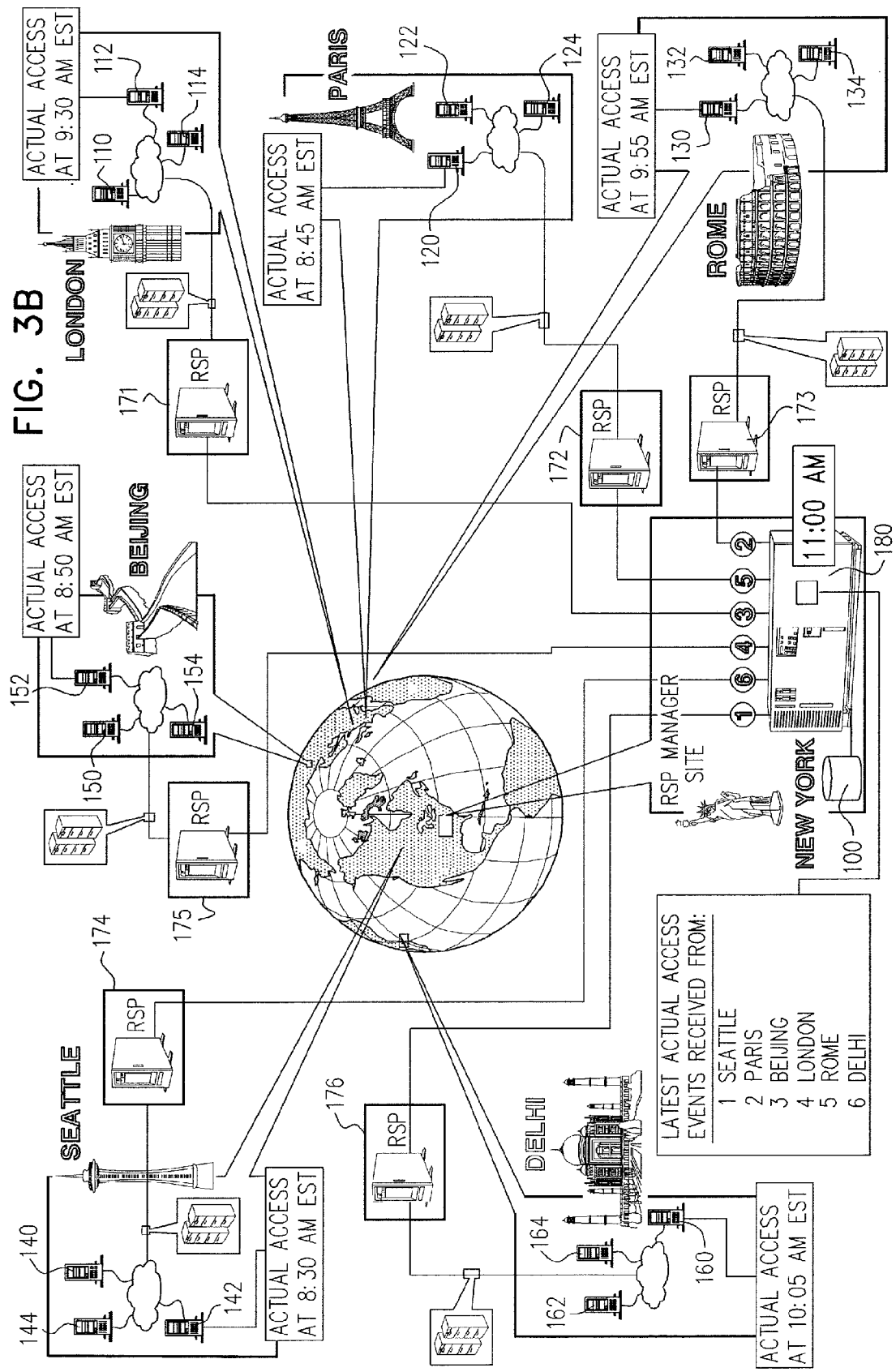
FIG. 3B is a simplified illustration of part of the system and methodology illustrated in FIG. 1 and FIG. 2, showing coordination of the timing of data collection by multiple ones of said plurality of RSPs showing prioritization of certain data resources over other data resources based at least partially on characteristics of real time event collection and of file system.

Reference is now made to FIG. 3B, which is a simplified illustration of part of the system and methodology illustrated in FIG. 1 and FIG. 2, showing coordination of the timing of data collection by multiple ones of said plurality of RSPs showing prioritization of certain data resources over other data resources based at least partially on characteristics of real time event collection and of file system.

In the example of FIG. 3B, a management rule is implemented by RSP Manager 180 whereby priority is given to data collection from data resources with respect to which access events have occurred.

RSP Manager 180 becomes aware of access events relating to various data resources, as by periodic querying the various RSPs. Immediately upon becoming aware of such an access event relating to server 160 monitored by RSP 176 located in Delhi, RSP manager 180 initially instructs RSP 176 to collect data from server 160. Typically thereafter, the RSP Manager 180, responsive to an earlier access event relating to server 130 monitored by RSP 173, located in Rome, instructs RSP 173 to collect data from server 130. Typically thereafter, the RSP Manager 180, responsive to an even earlier access event relating to server 112 monitored by RSP 171, located in London, instructs RSP 110 to collect data from server 112.

Typically thereafter, the RSP Manager 180, responsive to a still earlier access event relating to server 152 monitored by RSP 175, located in Beijing, instructs RSP 175 to collect data from server 152. Typically thereafter, the RSP Manager 180, responsive to a yet earlier access event relating to server 120 monitored by RSP 172, located in Paris, instructs RSP 172 to collect data server 120. Typically thereafter, the RSP Manager 180, responsive to an even earlier access event relating to server 142 monitored by RSP 174, located in Seattle, instructs RSP 174 to collect data from server 142.

It is appreciated that prioritization may be based not only on access events, but additionally and/or alternatively on more or more of the following:
real time event collection;
file system crawling for data structure and permissions;
data content analysis;
data indexing;
data tagging; and
event triggered alerts.

Figure 4A:
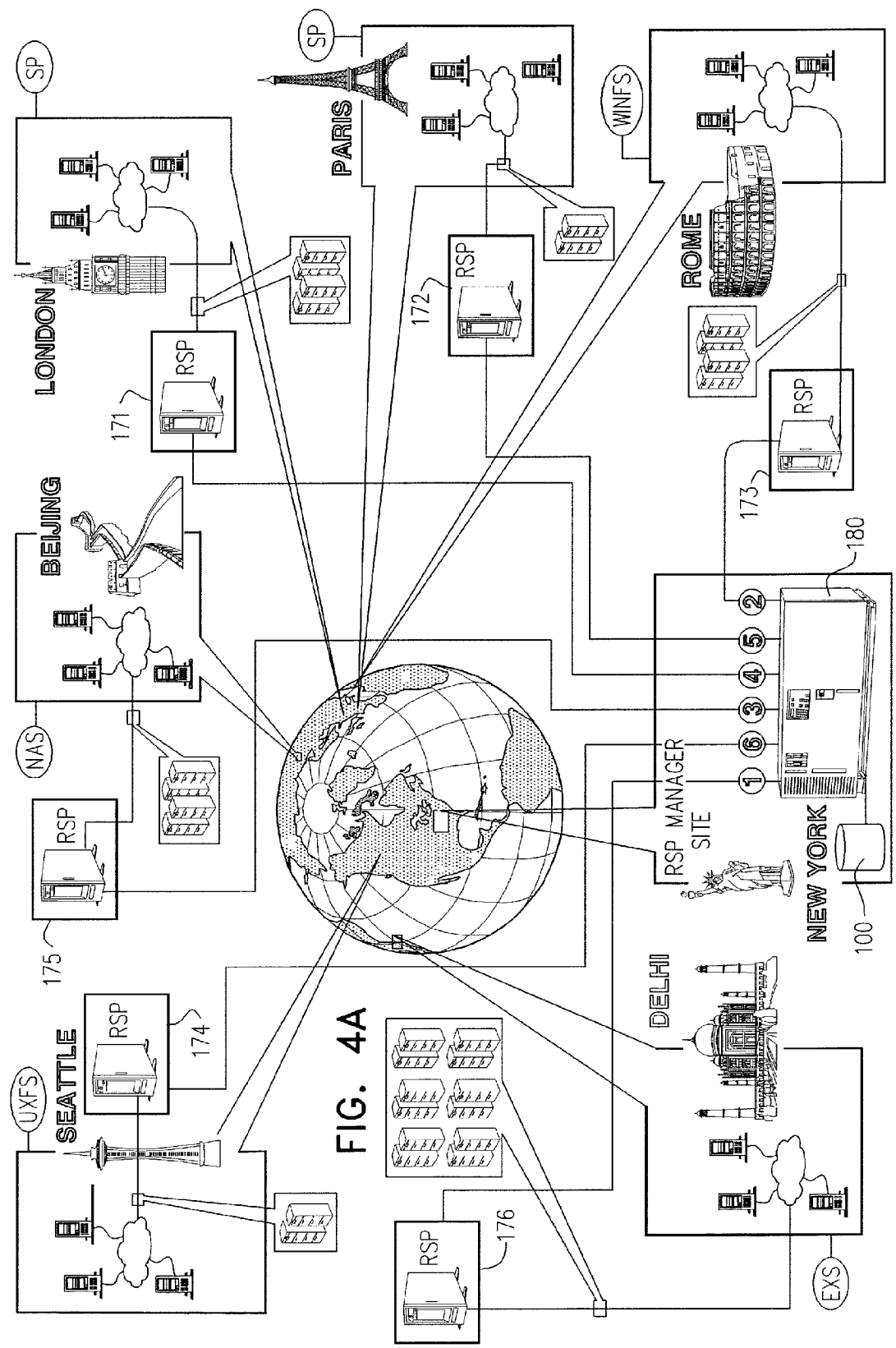
FIG. 4A is a simplified illustration of part of the system and methodology illustrated in FIG. 1 and FIG. 2, showing coordination of the timing of data collection by multiple ones of said plurality of RSPs on the basis of the amount of data to be collected from the data resources monitored thereby and on the basis of type of the data resources monitored thereby.

Reference is now made to FIG. 4A, which is a simplified illustration of part of the system and methodology illustrated in FIG. 1 and FIG. 2, showing coordination of the timing of data collection by multiple ones of said plurality of RSPs on the basis of the amount of data to be collected from the data resources monitored thereby and on the basis of type of the data resources monitored thereby.

The amount of data to be collected data is symbolized in FIG. 4A by a number of file cabinets containing data. The type of data resource is indicated by the following typical abbreviations: EXS—Exchange server, WIN FS—WINDOWS® File Server, NAS—Network Attached Storage Device, SP—SHAREPOINT® Servers and UX FS—UNIX® File Server.

In the example of FIG. 4A, two management rules are implemented by RSP Manager 180, namely:
whereby RSPs which monitor data resources having greater real time criticality, are instructed to collect data before RSPs which monitor data resources having lesser real time criticality; and
whereby RSPs which have a greater amount of data to transmit are instructed to collect before RSPs having a lesser amount of data to transmit.

Implementation of these rules in the context of an embodiment of the present invention is shown in FIG. 4A as follows: RSP Manager 180 initially instructs RSP 176 located in Delhi, which monitors multiple Exchange Servers that have a relatively high real time criticality, to collect a relatively large amount of data from the data resources monitored thereby.

Thereafter, RSP Manager 180 instructs RSP 173 located in Rome, which monitors multiple WINDOWS® File Servers that have yet a slightly lesser real time criticality, to collect a slightly lesser amount of data from the data resources monitored thereby. Thereafter, RSP Manager 180 instructs RSP 175 located in Beijing, which monitors multiple Network Attached Storage Device that have yet a slightly lower high real time criticality, to collect a similar amount of data from the data resources monitored thereby. Yet thereafter, RSP Manager 180 instructs RSP 171 located in London, which monitors multiple SHAREPOINT® Servers that have yet a slightly lower high real time criticality, to collect a similar amount of data from the data resources monitored thereby.

Thereafter, RSP Manager 180 instructs RSP 172 located in Paris, which also monitors multiple SHAREPOINT® Servers, to collect a relatively small amount of data from the data resources monitored thereby. Thereafter, RSP Manager 180 instructs RSP 174 located in Seattle, which monitors multiple UNIX® File Server that have a slightly lower high real time criticality, to collect a similar amount of data from the data resources monitored thereby.

Figure 4B:
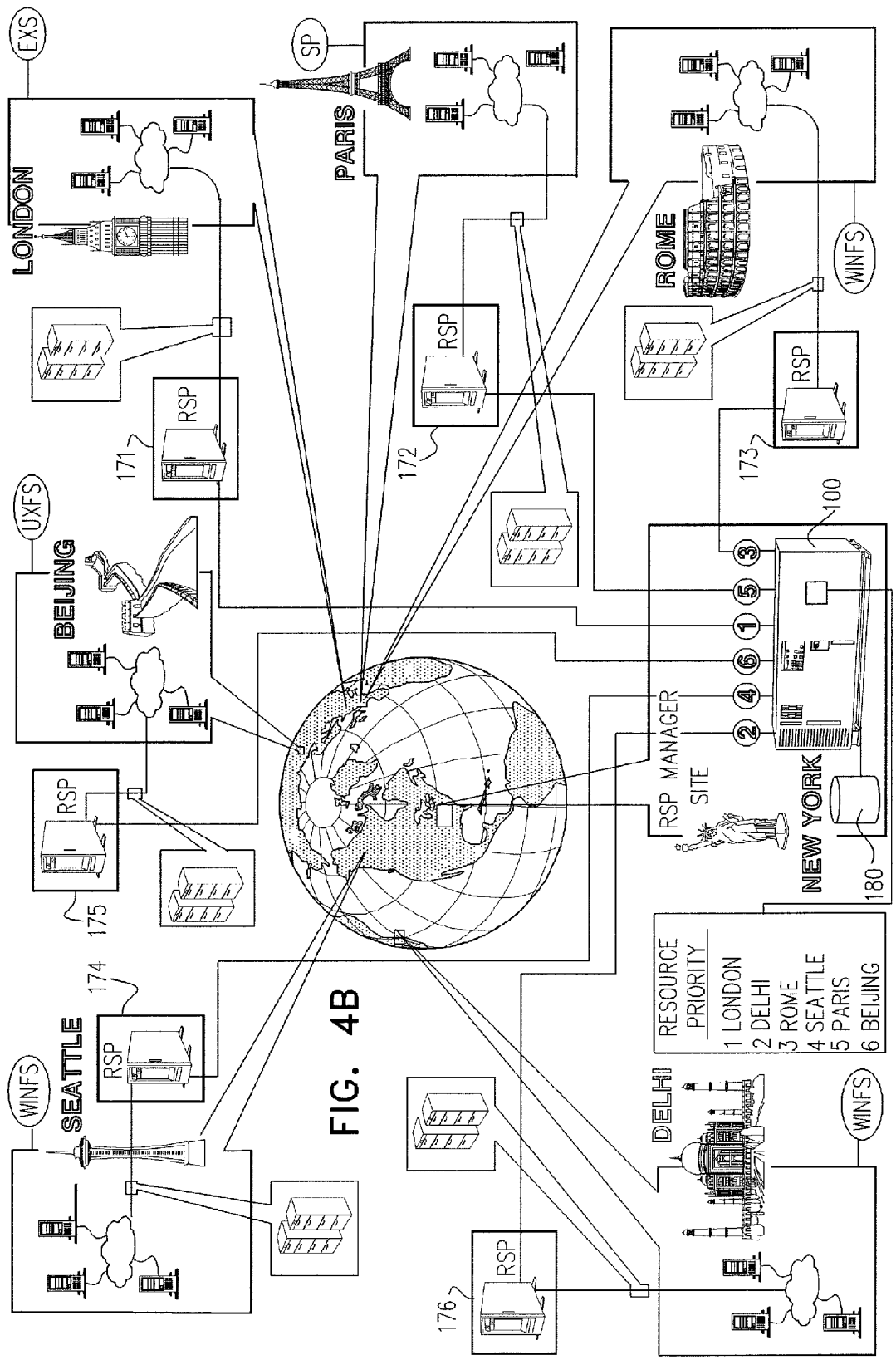
FIG. 4B is a simplified illustration of part of the system and methodology illustrated in FIG. 1 and FIG. 2, showing coordination of the timing of data collection by multiple ones of said plurality of RSPs on the basis of type of data resource and on the basis of user defined prioritization of RSPs located in various physical sites.

Reference is now made to FIG. 4B, which is a simplified illustration of part of the system and methodology illustrated in FIG. 1 and FIG. 2, showing coordination of the timing of data collection by multiple ones of said plurality of RSPs on the basis of type of data resource and on the basis of user defined prioritization of RSPs located in various physical sites.

The type of data resource from which data is to be collected is indicated in FIG. 4B by the following typical abbreviations: EXS—Exchange server, WIN FS—WINDOWS® File Server, NAS—Network Attached Storage Device, SP—SHAREPOINT® Servers and UX FS—UNIX® File Server.

In the example of FIG. 4B, two management rules are implemented by RSP Manager 180, namely:
whereby RSPs which monitor data resources having greater real time criticality, are instructed to collect data before RSPs which monitor data resources having lesser real time criticality; and
whereby RSPs having higher user defined priorities are instructed to collect data before RSPs having lower user defined priorities.

Implementation of these rules in the context of an embodiment of the present invention is shown in FIG. 4B as follows: RSP Manager 180 initially instructs RSP 171 located in London which has a high user-defined priority and which monitors multiple Exchange Servers which have a relatively high real time criticality, to collect data from the data resources monitored thereby.

Thereafter, RSP Manager 180 instructs RSP 176 located in Delhi which has a slightly lower user-defined priority and which monitors multiple WINDOWS® File Servers which have a slightly lower real time criticality, to collect data from the data resources monitored thereby. Thereafter, RSP Manager 180 instructs RSP 173, located in Rome which has yet an even more slightly lower user-defined priority and which also monitors multiple WINDOWS® File Servers, to collect data from the data resources monitored thereby. Yet thereafter, RSP Manager 180 instructs RSP 174 located in Seattle which has yet an even more slightly lower user-defined priority and which also monitors multiple WINDOWS® File Servers, to collect data from the data resources monitored thereby.

Thereafter, RSP Manager 180 instructs RSP 172 located in Paris which has yet an even more slightly lower user-defined priority and which monitors multiple SHAREPOINT® Servers which have a relatively low real time criticality, to collect data from the data resources monitored thereby. Thereafter, RSP Manager 180 instructs RSP 175, which is located in Beijing which has yet an even more slightly lower user-defined priority and which monitors multiple UNIX® File Servers which have even a slightly lower high real time criticality, to collect data from the data resources monitored thereby.

Figure 4C:
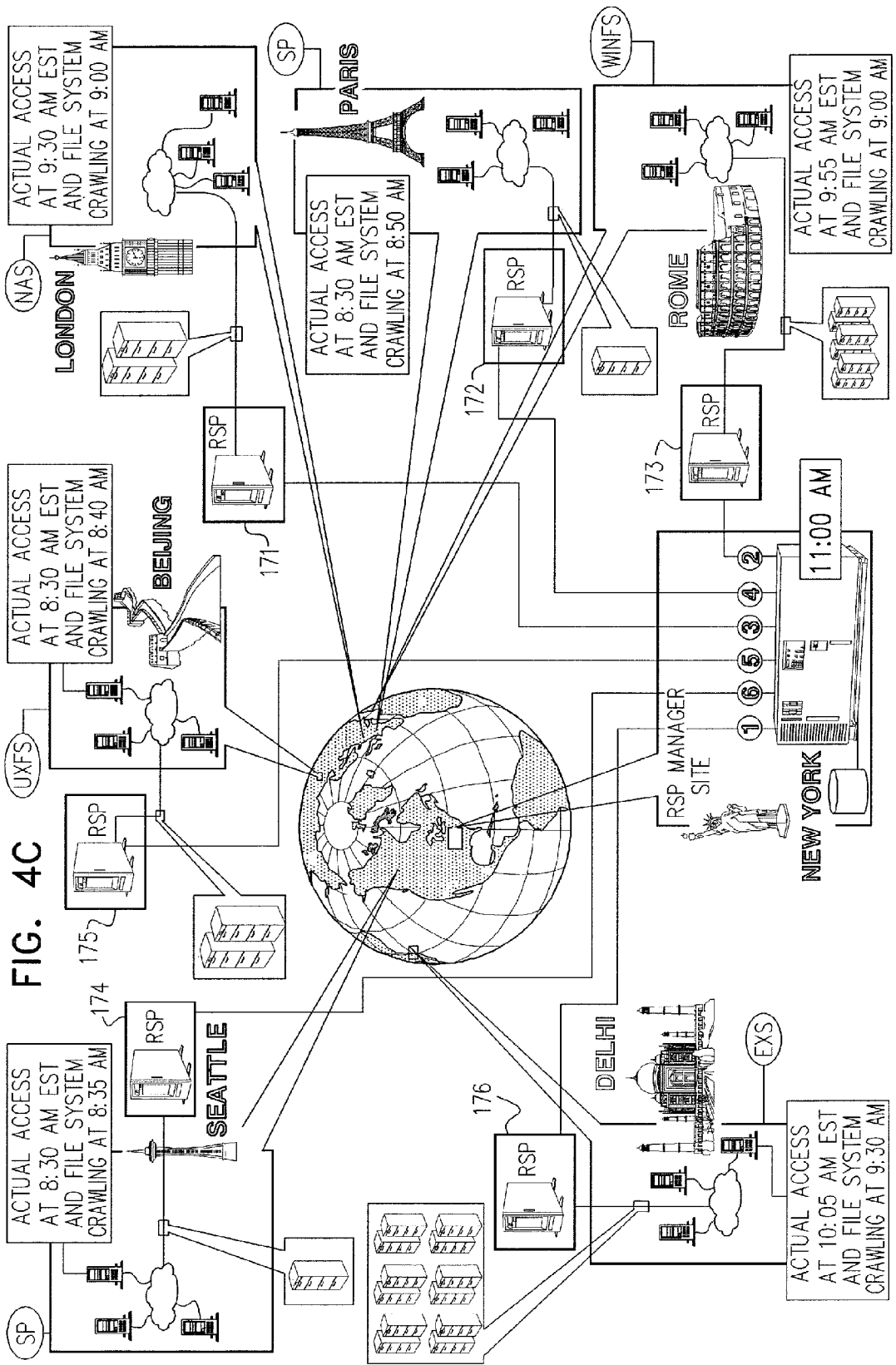
FIG. 4C is a simplified illustration of part of the system and methodology illustrated in FIG. 1 and FIG. 2, showing coordination of the timing of data collection by multiple ones of the plurality of RSPs on the basis of size of data resource and on the basis of type of data resource and showing prioritization of certain data resources over other data resources based at least partially on characteristics of real time event collection and of file system crawling for data structure and permissions.

Reference is now made to FIG. 4C, which is a simplified illustration of part of the system and methodology illustrated in FIG. 1 and FIG. 2, showing coordination of the timing of data collection by multiple ones of the plurality of RSPs on the basis of size of data resource and on the basis of type of data resource and showing prioritization of certain data resources over other data resources based at least partially on characteristics of real time event collection and of file system crawling for data structure and permissions.

The amount of data to be collected data is symbolized in FIG. 4C by a number of file cabinets containing data. The type of data resource is indicated by the following typical abbreviations: EXS—Exchange server, WIN FS—WINDOWS® File Server, NAS—Network Attached Storage Device, SP—SHAREPOINT® Servers and UX FS—UNIX® File Server.

In the example of FIG. 4C, four management rules are implemented by RSP Manager 180, namely:

whereby RSPs which monitor data resources having greater real time criticality, are instructed to collect data before RSPs which monitor data resources having lesser real time criticality;

whereby RSPs which have a greater amount of data to transmit are instructed to collect before RSPs having a lesser amount of data to transmit;

whereby priority is given to data collection from data resources with respect to which access events have occurred; and whereby priority is given to data collection from data resources with respect to which file system crawling for data structure and permissions have recently occurred.

Implementation of these rules in the context of an embodiment of the present invention is shown in FIG. 4C as follows: RSP Manager 180 becomes aware of access events and recent file system crawling for data structure and permissions relating to various data resources, as by periodic querying the various RSP. Immediately upon become aware of such an access event relating to a data resource monitored by RSP 176 located in Delhi, and for which data resource a file system crawling was recently performed, RSP manager 180 instructs RSP 176, which monitors multiple Exchange Servers that have a relatively high real time criticality, to collect a relatively large amount of data from the data resources monitored thereby.

Thereafter, RSP Manager 180, responsive to an earlier access event relating to a data resource monitored by RSP 173 located in Rome, and to an earlier file system crawl of a data resource monitored by RSP 173, instructs RSP, which monitors multiple WINDOWS® File Servers which have a slightly lower real time criticality, to collect a slightly lesser amount of data from the data resources monitored thereby. Typically thereafter, RSP Manager 180, responsive to an even earlier access event relating to a data resource monitored by RSP 171 located in London, and to an earlier file system crawl of a data resource monitored by RSP 171, instructs RSP 171, which monitors multiple Network Attached Storage Device that have a slightly lower high real time criticality, to collect a slightly lesser amount of data from the data resources monitored thereby.

Yet thereafter, RSP Manager 180, responsive to an even earlier access event relating to a data resource monitored by RSP 172 is located in Paris, and to a yet earlier file system crawl of a data resource monitored by RSP 172, instructs RSP 172, which monitors multiple SHAREPOINT® Servers that have a slightly lower high real time criticality, to collect a slightly lesser amount of data from the data resources monitored thereby.

Thereafter, RSP Manager 180, responsive to an even earlier access event relating to a data resource monitored by RSP 175 located in Beijing, and to a yet earlier file system crawl of a data resource monitored by RSP 175, instructs RSP 175, which monitors multiple UNIX® File Servers that have a slightly lower high real time criticality, to collect a slightly less amount of data from the data resources monitored thereby. Thereafter, RSP Manager 180, responsive to an even earlier access event relating to a data resource monitored by RSP 174 located in Seattle, and to a yet earlier file system crawl of a data resource monitored by RSP 174, instructs RSP 174, which also monitors multiple SHAREPOINT® Servers, to collect a similar amount of data from the data resources monitored thereby.

Reference is now made to FIG. 5A, which is a simplified illustration of part of the system and methodology illustrated in FIG. 1 and FIG. 2, showing coordination of the timing of data collection by multiple ones of said plurality of RSPs on the basis of network latency. Network latency is symbolized in FIG. 5A by traffic congestion, the greater the congestion the greater the latency. In the example of FIG. 5A, a management rule is implemented by RSP Manager 180 whereby network connections having lesser latency are utilized before network connections having greater latency.

Implementation of this rule in the context of an embodiment of the present invention is shown in FIG. 5A as follows: RSP Manager 180 initially instructs RSP 176 located in Delhi to transmit data collected thereby to the RSP Manager 180 over a network connection 306 which has relatively low latency. Thereafter, RSP Manager 180 instructs RSP 174 located in Seattle to transmit data collected thereby to the RSP Manager 180 over a network connection 315 which has slightly higher latency than network connection 306. Thereafter, RSP Manager 180 instructs RSP 175 located in Beijing to transmit data collected thereby to the RSP Manager 180 over a network connection 324, which has slightly higher latency than network connection 315.

Thereafter, RSP Manager 180 instructs RSP 171 located in London to transmit data collected thereby to the RSP Manager 180 over a network connection 331, which has slightly higher latency than network connection 324. Thereafter, RSP Manager 180 instructs RSP 172 located in Paris to transmit data collected thereby to the RSP Manager 180 over a network connection 332, which has slightly higher latency than network connection 331. Thereafter, RSP Manager 180 instructs RSP 173 located in Rome to transmit data collected thereby to the RSP Manager 180 over a network connection 333, which has slightly higher latency than network connection 332.

Figure 5B:
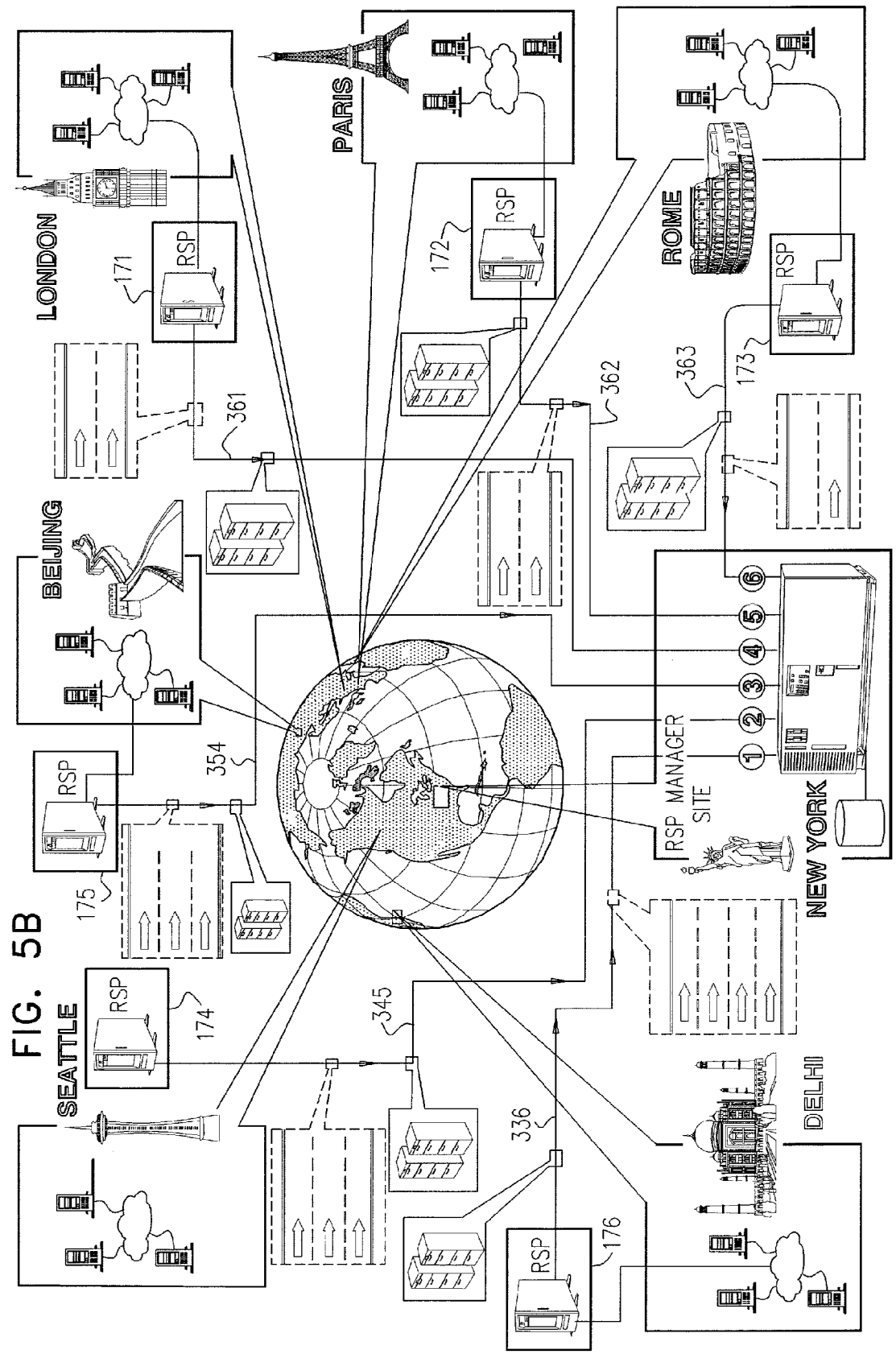
FIG. 5B is a simplified illustration of part of the system and methodology illustrated in FIG. 1 and FIG. 2, showing coordination of the timing of data transmission by multiple ones of said plurality of RSPs on the basis of network bandwidth.

Reference is now made to FIG. 5B, which is a simplified illustration of part of the system and methodology illustrated in FIG. 1 and FIG. 2, showing coordination of the timing of data collection by multiple ones of said plurality of RSPs on the basis of network bandwidth. Network bandwidth is symbolized in FIG. 5B by a number of traffic lanes, the greater the number of lanes the greater the bandwidth. In the example of FIG. 5B, a management rule is implemented by RSP Manager 180 whereby network connections having greater bandwidth are utilized before network connections having lesser bandwidth.

Implementation of this rule in the context of an embodiment of the present invention is shown in FIG. 5B as follows: RSP Manager 180 initially instructs RSP 176 located in Delhi to transmit data collected thereby to the RSP Manager 180 over a network connection 336 which has relatively high bandwidth. Thereafter, RSP Manager 180 instructs RSP 174 located in Seattle to transmit data collected thereby to the RSP Manager 180 over a network connection 345 which has slightly lower bandwidth than network connection 336. Thereafter or simultaneously, RSP Manager 180 instructs RSP 175 located in Beijing to transmit data collected thereby to the RSP Manager 180 over a network connection 354, which has bandwidth similar to that of network connection 345.

Thereafter, RSP Manager 180 instructs RSP 171 located in London to transmit data collected thereby to the RSP Manager 180 over a network connection 361, which has slightly lower bandwidth than network connection 354. Thereafter or simultaneously, RSP Manager 180 instructs RSP 172 located in Paris to transmit data collected thereby to the RSP Manager 180 over a network connection 362, which has bandwidth similar to that of network connection 361. Thereafter, RSP Manager 180 instructs RSP 173 located in Rome to transmit data collected thereby to the RSP Manager 180 over a network connection 363, which has slightly lower bandwidth than network connection 362.

Reference is now made to FIG. 5C, which is a simplified illustration of part of the system and methodology illustrated in FIG. 1 and FIG. 2, showing coordination of the timing of data transmission by multiple ones of said plurality of RSPs on the basis of the amount of collected data to be transmitted. The amount of collected data to be transmitted is symbolized in FIG. 5C by a number of file cabinets containing data. In the example of FIG. 5C, a management rule is implemented by RSP Manager 180 whereby RSPs which have a greater amount of data to transmit are instructed to transmit before RSPs having a lesser amount of data to transmit.

Implementation of this rule in the context of an embodiment of the present invention is shown in FIG. 5C as follows: RSP Manager 180 initially instructs RSP 176 located in Delhi to transmit a relatively large amount of data collected thereby to RSP Manager 180. Thereafter, RSP Manager 180 instructs RSP 173 located in Rome to transmit a slightly lesser amount of data collected thereby to RSP Manager 180. Thereafter, RSP Manager 180 instructs RSP 171 located in London to transmit an even lesser amount of data collected thereby to RSP Manager 180.

Thereafter, RSP Manager 180 instructs RSP 175 located in Beijing to transmit an even smaller amount of data collected thereby to RSP Manager 180. Thereafter or simultaneously, RSP Manager 180 instructs RSP 172 located in Paris to transmit a similar amount of data collected thereby to the RSP Manager 180. Thereafter, RSP Manager 180 instructs RSP 174 located in Seattle to transmit a yet smaller amount of data collected thereby to RSP Manager 180.

Reference is now made to FIG. 5D, which is a simplified illustration of part of the system and methodology illustrated in FIG. 1 and FIG. 2, showing coordination of the timing of data transmission by multiple ones of said plurality of RSPs on the basis of type of data resources monitored by the RSPs. The type of data resource is indicated by the following typical abbreviations: EXS—Exchange server, WIN FS—WINDOWS® File Server, NAS—Network Attached Storage Device, SP—SHAREPOINT® Servers and UX FS—UNIX® File Server. In the example of FIG. 5D, a management rule is implemented by RSP Manager 180 whereby RSPs which monitor data resources having greater real time criticality, are instructed to transmit before RSPs which monitor data resources having lesser real time criticality.

Implementation of this rule in the context of an embodiment of the present invention is shown in FIG. 5D as follows: RSP Manager 180 initially instructs RSP 171, which monitors multiple Exchange Servers, which are determined, for example, to have relatively high real time criticality, to transmit data collected thereby to RSP Manager 180. Thereafter, RSP Manager 180 instructs RSP 176, which monitors multiple WINDOWS® File Servers, which are determined, for example, to have slightly lower real time criticality, to transmit data collected thereby to RSP Manager 180. Thereafter, RSP Manager 180 instructs RSP 173, which monitors multiple NAS devices, which are determined, for example, to have even lower real time criticality, to transmit data collected thereby to RSP Manager 180.

Thereafter, RSP Manager 180 instructs RSP 174, which monitors multiple SHAREPOINT® File Servers, which are determined, for example, to have still lower real time criticality, to transmit data collected thereby to RSP Manager 180. Thereafter, RSP Manager 180 instructs RSP 172, which monitors multiple UNIX® File Servers, which are determined, for example, to have yet lower real time criticality, to transmit data collected thereby to RSP Manager 180. Thereafter or simultaneously, RSP Manager 180 instructs RSP 175, which also monitors multiple UNIX® File Servers, which are determined, for example, to have similarly low real time criticality, to transmit data collected thereby to the RSP Manager 180.

Reference is now made to FIG. 5E, which is a simplified illustration of part of the system and methodology illustrated in FIG. 1 and FIG. 2, showing coordination of the timing of data transmission by multiple ones of said plurality of RSPs on the basis of user defined prioritization of RSPs located in various physical sites.

In the example of FIG. 5E, a management rule is implemented by RSP Manager 180 whereby RSPs having higher user defined priorities are instructed to transmit before RSPs having lower user defined priorities. In the illustrated example of FIG. 5E, RSPs, which are located in locations having higher user-defined priorities, are instructed to transmit before RSPs which are located in locations having lower user-defined priorities.

Implementation of this rule in the context of an embodiment of the present invention is shown in FIG. 5E as follows: RSP Manager 180 initially instructs RSP 175 located in Beijing, which has the highest user-defined priority, to transmit data collected thereby to the RSP Manager 180. Thereafter, RSP Manager 180 instructs RSP 174 located in Seattle, which has the next-highest user-defined priority, to transmit data collected thereby to the RSP Manager 180. Thereafter, RSP Manager 180 instructs RSP 176 located in Delhi, which has the third highest user-defined priority, to transmit data collected thereby to the RSP Manager 180.

Thereafter, RSP Manager 180 instructs RSP 172 located in Paris, which has the fourth-highest user-defined priority, to transmit data collected thereby to the RSP Manager 180. Thereafter, RSP Manager 180 instructs RSP 171 located in London, which has the fifth-highest user-defined priority, to transmit data collected thereby to the RSP Manager 180. Thereafter RSP Manager 180 instructs RSP 173 located in Rome which has the next highest user-defined priority, to transmit data collected thereby to the RSP Manager 180.

Figure 5F:
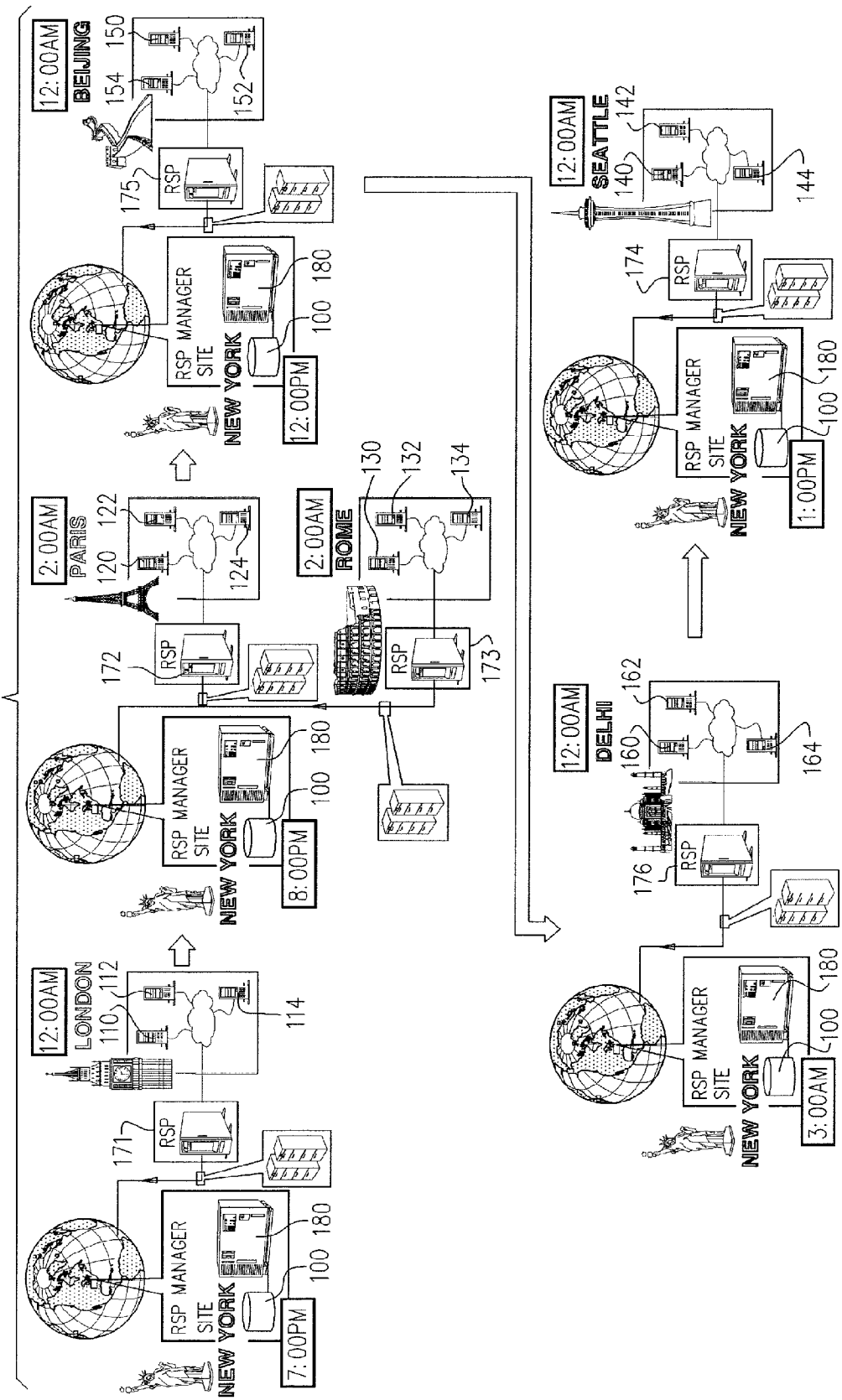
FIG. 5F is a simplified illustration of part of the system and methodology illustrated in FIG. 1 and FIG. 2, showing coordination of the timing of data transmission by multiple ones of said plurality of RSPs on the basis of time of day/day of week at the RSP.

Reference is now made to FIG. 5F, which is a simplified illustration of part of the system and methodology illustrated in FIG. 1 and FIG. 2, showing coordination of the timing of data transmission by multiple ones of said plurality of RSPs on the basis of time of day/day of week at the RSP.

In the example of FIG. 5F, a management rule is implemented by RSP Manager 180 whereby RSPs are instructed to transmit data at times when data resources have low utilization rates, such as during the local nighttime hours thereat.

Implementation of this rule in the context of an embodiment of the present invention is shown in FIG. 5F as follows: At 12:00 midnight local London time, RSP Manager 180 instructs RSP 171 located in London to transmit data collected from servers 110, 112 and 114 monitored thereby. Thereafter, at 2:00 AM local Paris time RSP Manager 180 instructs RSP 172 located in Paris to transmit data collected from servers 120, 122 and 124 monitored thereby. Simultaneously, at 2:00 AM local Rome time RSP Manager 180 instructs RSP 173 located in Rome to transmit data collected from servers 130, 132 and 134 monitored thereby.

Thereafter, at 12:00 midnight the next day local Beijing time, RSP Manager 180 instructs RSP 175 located in Beijing to transmit data collected from servers 150, 152 and 154 monitored thereby. Thereafter, at 12:00 midnight local Delhi time RSP Manager 180 instructs RSP 176 located in Delhi to transmit data collected from servers 160, 162 and 164 monitored thereby. Thereafter, at 12:00 midnight local Seattle time RSP Manager 180 instructs RSP 174 located in Seattle to transmit data collected from servers 140, 142 and 144 monitored thereby.

Figure 5G:
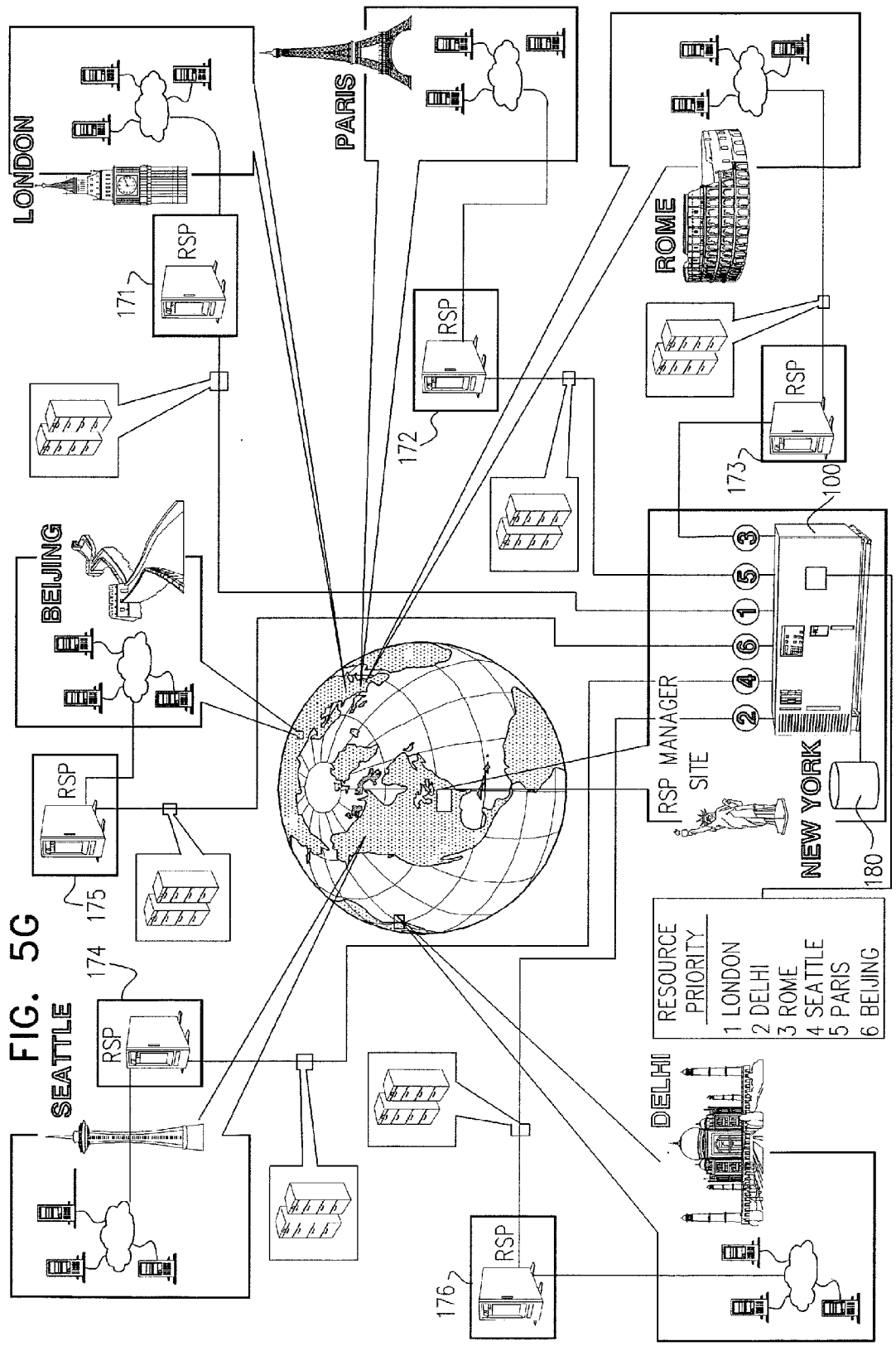
FIG. 5G is a simplified illustration of part of the system and methodology illustrated in FIG. 1 and FIG. 2, showing coordination of the timing of data transmission by multiple ones of said plurality of RSPs on the basis of user defined prioritization of data resources.

Reference is now made to FIG. 5G, which is a simplified illustration of part of the system and methodology illustrated in FIG. 1 and FIG. 2, showing coordination of the timing of data transmission by multiple ones of said plurality of RSPs on the basis of user defined prioritization of data resources.

In the example of FIG. 5G, a management rule is implemented by RSP Manager 180 whereby RSPs having higher user defined priorities are instructed to transmit data before RSPs having lower user defined priorities. In the illustrated example of FIG. 5G, RSPs, which are located in locations having higher user-defined priorities, are instructed to collect data to be transmitted before RSPs which are located in locations having lower user-defined priorities.

Implementation of this rule in the context of an embodiment of the present invention is shown in FIG. 5G as follows: RSP Manager 180 initially instructs RSP 171 located in London which has a high user-defined priority to transmit data collected from the data resources monitored thereby.

Thereafter, RSP Manager 180 instructs RSP 176 located in Delhi which has a slightly lower user-defined priority to transmit data collected from the data resources monitored thereby. Thereafter, RSP Manager 180 instructs RSP 173, located in Rome which has yet an even more slightly lower user-defined priority to transmit data collected from the data resources monitored thereby. Yet thereafter, RSP Manager 180 instructs RSP 174 located in Seattle which has yet an even more slightly lower user-defined priority, to transmit data collected from the data resources monitored thereby.

Thereafter, RSP Manager 180 instructs RSP 172 located in Paris which has yet an even more slightly lower user-defined priority, to transmit data collected from the data resources monitored thereby. Thereafter, RSP Manager 180 instructs RSP 175, which is located in Beijing which has yet an even more slightly lower user-defined priority to transmit data collected from the data resources monitored thereby.

Figure 5H:
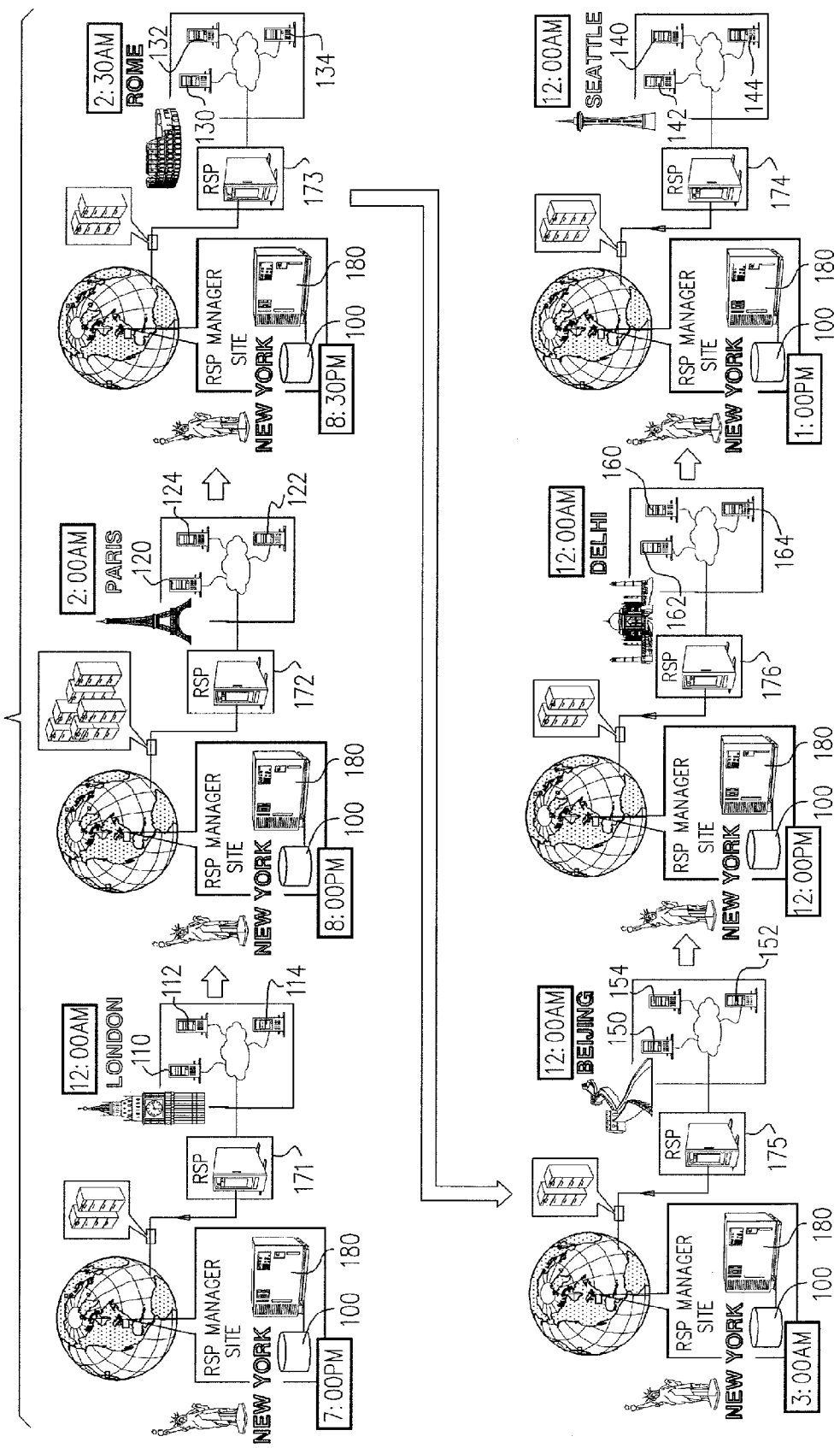
FIG. 5H is a simplified illustration of part of the system and methodology illustrated in FIG. 1 and FIG. 2, showing coordination of the timing of data transmission by multiple ones of said plurality of RSPs on the basis of time of day/day of week at the RSP and on the on the basis of the amount of collected data to be transmitted.

Reference is now made to FIG. 5H, which is a simplified illustration of part of the system and methodology illustrated in FIG. 1 and FIG. 2, showing coordination of the timing of data transmission by multiple ones of said plurality of RSPs on the basis of on the basis of time of day/day of week at the RSP and on the basis of the amount of collected data to be transmitted. The amount of collected data to be transmitted is symbolized in FIG. 5H by a number of file cabinets containing data. In the example of FIG. 5H, two management rules are implemented by RSP Manager 180, namely:

whereby RSPs are instructed to transmit data collected from their respective data resources at times the network connections to those RSPs have low utilization rates, such as during the local nighttime hours thereat; and whereby RSPs which have a greater amount of data to transmit are instructed to transmit before RSPs having a lesser amount of data to transmit.

Implementation of these rules in the context of an embodiment of the present invention is shown in FIG. 5H as follows:

At 12:00 midnight local London time, RSP Manager 180 instructs RSP 171, located in London, to transmit data collected from the data resources monitored thereby. Thereafter, at 2:00 AM local Paris time, RSP Manager 180 instructs RSP 172, located in Paris, to transmit a relatively large amount of data collected from the data resources monitored thereby. Since RSP 173 in Rome has less data to transmit than does the RSP 172, located in Paris, the data transmission from the RSP 130 in Rome is set to be later than the data transmission from the RSP 172, located in Paris. Accordingly, at 2:30 AM local Rome time, RSP Manager 180 instructs RSP 173, located in Rome, to transmit data collected from the data resources monitored thereby.

Thereafter, at 12:00 midnight the next day local Beijing time, RSP Manager 180 instructs RSP 175 located in Beijing to transmit data collected from the data resources monitored thereby. Thereafter, at 12:00 midnight local Delhi time RSP Manager 180 instructs RSP 176 located in Delhi to transmit data collected from the data resources monitored thereby. Thereafter, at 12:00 midnight local Seattle time RSP Manager 180 instructs RSP 174 located in Seattle to transmit data collected from the data resources monitored thereby.

Figure 6A:
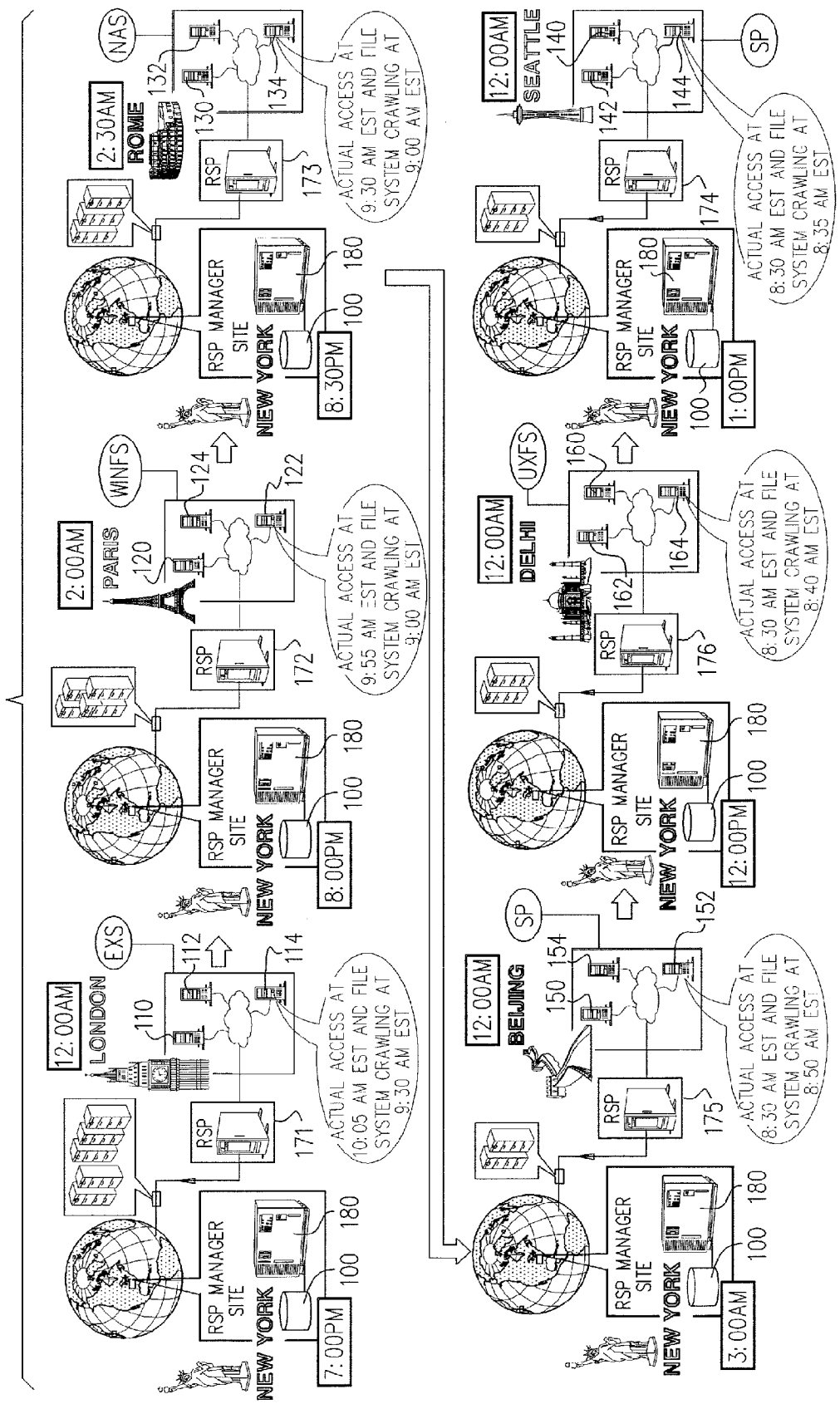
FIG. 6A is a simplified illustration of part of the system and methodology illustrated in FIG. 1 and FIG. 2, showing coordination of the timing of data collection by multiple ones of the plurality of RSPs on the basis of size of data resource and on the basis of type of data resource and showing prioritization of certain data resources over other data resources based at least partially on characteristics of real time event collection and of file system crawling for data structure and permissions and showing coordination of the timing of at least some of the data transmission from ones of the plurality of RSPs on the basis of time of day/day of week at the RSP.

Reference is now made to FIG. 6A, which is a simplified illustration of part of the system and methodology illustrated in FIG. 1 and FIG. 2, showing coordination of the timing of data collection by multiple ones of the plurality of RSPs on the basis of size of data resource and on the basis of type of data resource and showing prioritization of certain data resources over other data resources based at least partially on characteristics of real time event collection and of file system crawling for data structure and permissions and showing coordination of the timing of at least some of the data transmission from ones of the plurality of RSPs on the basis of time of day/day of week at the RSP.

The amount of data to be collected data is symbolized in FIG. 6A by a number of file cabinets containing data. The type of data resource is indicated by the following typical abbreviations: EXS—Exchange server, WIN FS—WINDOWS® File Server, NAS—Network Attached Storage Device, SP—SHAREPOINT® Servers and UX FS—UNIX® File Server.

In the example of FIG. 6A, five management rules are implemented by RSP Manager 180, namely:

whereby RSPs which monitor data resources having greater real time criticality, are instructed to collect data before RSPs which monitor data resources having lesser real time criticality;

whereby RSPs which have a greater amount of data to transmit are instructed to collect before RSPs having a lesser amount of data to transmit;

whereby priority is given to data collection from data resources with respect to which access events have occurred;

whereby priority is given to data collection from data resources with respect to which file system crawling for data structure and permissions have recently occurred; and whereby RSPs are instructed to transmit data at times when data resources have low utilization rates, such as during the local nighttime hours thereat.

Implementation of these rules in the context of an embodiment of the present invention is shown in FIG. 6A as follows: RSP Manager 180 becomes aware of access events and recent file system crawling for data structure and permissions relating to various data resources, as by periodic querying the various RSP. Upon become aware of such an access event relating to a data resource monitored by RSP 171, located in London and for which data resource a file system crawling was recently performed, the RSP manager 180 instructs RSP 171, which monitors multiple Exchange Servers which have a relatively high real time criticality, to collect a relatively large amount of data from the data resources monitored thereby at 12:00 midnight local London time.

Thereafter, RSP Manager 180, responsive to an earlier access event relating to a data resource monitored by RSP 172 located in Paris and to an earlier file system crawl of a data resource monitored by RSP 172, instructs RSP 172, which monitors multiple WINDOWS® File Servers that have a slightly lower real time criticality, to collect a slightly lesser amount of data from the data resources monitored thereby at 2:00 AM local Paris time. Thereafter, RSP Manager 180, responsive to an even earlier access event relating to a data resource monitored by RSP 173 located in Rome and to an earlier file system crawl of a data resource monitored by RSP 173, instructs RSP 173, which monitors multiple Network Attached Storage Device that have a slightly lower high real time criticality, to collect a slightly lesser amount of data from the data resources monitored thereby.

Yet thereafter, RSP Manager 180, responsive to an even earlier access event relating to a data resource monitored by RSP 175 located in Beijing and to a yet earlier file system crawl of a data resource monitored by RSP 175, instructs RSP 175, which monitors multiple SHAREPOINT® Servers that have a slightly lower high real time criticality, to collect a similar amount of data from the data resources monitored thereby at 12:00 midnight the next day local Beijing time.

Thereafter, RSP Manager 180, responsive to an even earlier access event relating to a data resource monitored by RSP 176 located in Delhi and to a yet earlier file system crawl of a data resource monitored by RSP 176, instructs RSP 176, which monitors multiple UNIX® File Servers that have a slightly lower high real time criticality, to collect a slightly less amount of data from the data resources monitored thereby at 12:00 midnight local Delhi time.

Thereafter, the RSP Manager 180, responsive to an even earlier access event relating to a data resource monitored by RSP 174 located in Seattle and to a yet earlier file system crawl of a data resource monitored by RSP 174, instructs RSP 174, which monitors multiple SHAREPOINT® Servers that have a slightly lower high real time criticality, to collect a similar amount of data from the data resources monitored thereby.

Figure 6B:
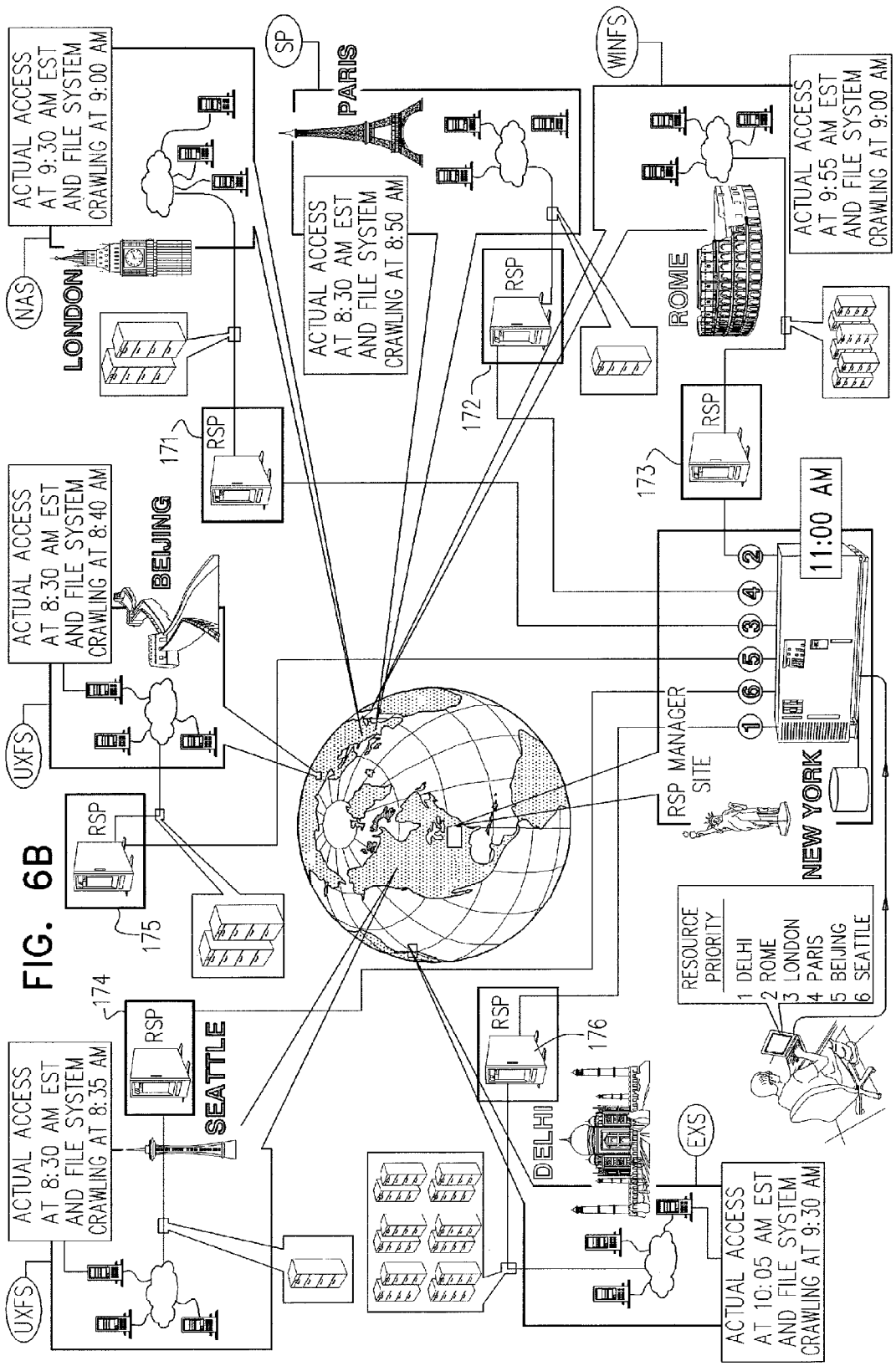
FIG. 6B is a simplified illustration of part of the system and methodology illustrated in FIG. 1 and FIG. 2, showing coordination of the timing of data collection by multiple ones of the plurality of RSPs on the basis of size of data resource and on the basis of type of data resource and showing prioritization of certain data resources over other data resources based at least partially on characteristics of real time event collection and of file system crawling for data structure and permissions and based on prioritization of certain RSPs over other RSPs.

Reference is now made to FIG. 6B, which is a simplified illustration of part of the system and methodology illustrated in FIG. 1 and FIG. 2, showing coordination of the timing of data collection by multiple ones of the plurality of RSPs on the basis of size of data resource and on the basis of type of data resource and showing prioritization of certain data resources over other data resources based at least partially on characteristics of real time event collection and of file system crawling for data structure and permissions and based on prioritization of certain RSPs over other RSPs.

The amount of data to be collected data is symbolized in FIG. 6B by a number of file cabinets containing data. The type of data resource is indicated by the following typical abbreviations: EXS—Exchange server, WIN FS—WINDOWS® File Server, NAS—Network Attached Storage Device, SP—SHAREPOINT® Servers and UX FS—UNIX® File Server.

In the example of FIG. 6B, five management rules are implemented by RSP Manager 180, namely:

whereby RSPs which monitor data resources having greater real time criticality, are instructed to collect data before RSPs which monitor data resources having lesser real time criticality;

whereby RSPs which have a greater amount of data to transmit are instructed to collect before RSPs having a lesser amount of data to transmit;

whereby priority is given to data collection from data resources with respect to which access events have occurred;

whereby priority is given to data collection from data resources with respect to which file system crawling for data structure and permissions have recently occurred; and whereby RSPs having higher user defined priorities are instructed to transmit before RSPs having lower user defined priorities.

Implementation of these rules in the context of an embodiment of the present invention is shown in FIG. 6B as follows: RSP Manager 180 becomes aware of access events and recent file system crawling for data structure and permissions relating to various data resources, as by periodic querying the various RSP. Immediately upon become aware of such an access event relating to a data resource monitored by RSP 176, located in Delhi which has the highest user-defined priority and for which data resource a file system crawling was recently performed, the RSP manager 180 instructs RSP 176, which is located in Delhi and which monitors multiple Exchange Servers that have a relatively high real time criticality, to collect a relatively large amount of data from the data resources monitored thereby.

Thereafter, RSP Manager 180, responsive to an earlier access event relating to a data resource monitored by RSP 173 and to an earlier file system crawl of a data resource monitored by RSP 173 which has the next-highest user-defined priority, instructs RSP 173 located in Rome, which monitors multiple WINDOWS® File Servers that have a relatively high real time criticality, to collect a slightly lesser amount of data from the data resources monitored thereby. Typically thereafter, the RSP Manager 180, responsive to an even earlier access event relating to a data resource monitored by RSP 171 and to an earlier file system crawl of a data resource monitored by RSP 171, instructs RSP 171 located in London, which has the third highest user-defined priority, which monitors multiple Network Attached Storage Device that have a slightly lower high real time criticality, to collect a slightly lesser amount of data from the data resources monitored thereby.

Yet thereafter, the RSP Manager 180, responsive to an even earlier access event relating to a data resource monitored by RSP 172 and to a yet earlier file system crawl of a data resource monitored by RSP 172, instructs RSP 172 located in Paris, which has the fourth-highest user-defined priority, and which monitors multiple SHAREPOINT® Servers that have a slightly lower high real time criticality, to collect a similar amount of data from the data resources monitored thereby.

Thereafter, the RSP Manager 180, responsive to an even earlier access event relating to a data resource monitored by RSP 175 and to a yet earlier file system crawl of a data resource monitored by RSP 175, instructs RSP 175 located in Beijing, which has the fifth-highest user-defined priority, and which monitors multiple UNIX® File Servers that have a slightly lower high real time criticality, to collect a slightly less amount of data from the data resources monitored thereby. Thereafter or simultaneously, the RSP Manager 180, responsive to an even earlier access event relating to a data resource monitored by RSP 174 and to a yet earlier file system crawl of a data resource monitored by RSP 174, instructs RSP 174 located in Seattle, which has the next highest user-defined priority, and which also monitors multiple UNIX® File, to collect a similar amount of data from the data resources monitored thereby.

Figure 7:
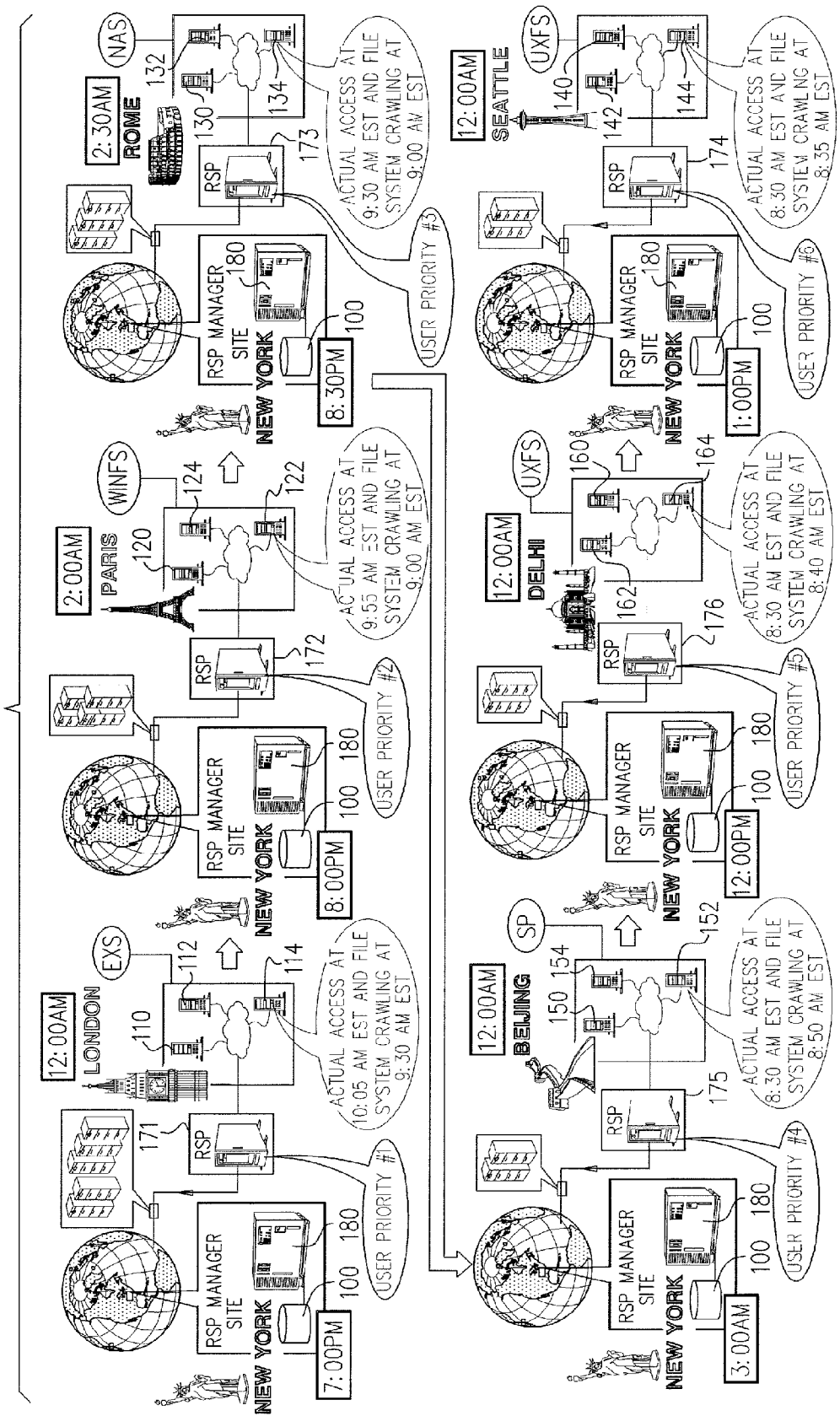
FIG. 7 is a simplified illustration of part of the system and methodology illustrated in FIG. 1 and FIG. 2, showing coordination of the timing of data collection by multiple ones of the plurality of RSPs on the basis of size of data resource and on the basis of type of data resource and showing prioritization of certain data resources over other data resources based at least partially on characteristics of real time event collection and of file system crawling for data structure and permissions and based on prioritization of certain RSPs over other RSPs and showing coordination of the timing of at least some of the data transmission from ones of the plurality of RSPs on the basis of time of day/day of week at the RSP.

Reference is now made to FIG. 7, which is a simplified illustration of part of the system and methodology illustrated in FIG. 1 and FIG. 2, showing coordination of the timing of data collection by multiple ones of the plurality of RSPs on the basis of size of data resource and on the basis of type of data resource and showing prioritization of certain data resources over other data resources based at least partially on characteristics of real time event collection and of file system crawling for data structure and permissions and based on prioritization of certain RSPs over other RSPs and showing coordination of the timing of at least some of the data transmission from ones of the plurality of RSPs on the basis of time of day/day of week at the RSP.

The amount of data to be collected data is symbolized in FIG. 7 by a number of file cabinets containing data. The type of data resource is indicated by the following typical abbreviations: EXS—Exchange server, WIN FS—WINDOWS® File Server, NAS—Network Attached Storage Device, SP—SHAREPOINT® Servers and UX FS—UNIX® File Server.

In the example of FIG. 7, six management rules are implemented by RSP Manager 180, namely:

whereby RSPs which monitor data resources having greater real time criticality, are instructed to collect data before RSPs which monitor data resources having lesser real time criticality;

whereby RSPs which have a greater amount of data to transmit are instructed to collect before RSPs having a lesser amount of data to transmit;

whereby priority is given to data collection from data resources with respect to which access events have occurred;

whereby priority is given to data collection from data resources with respect to which file system crawling for data structure and permissions have recently occurred;

whereby RSPs are instructed to transmit data at times when data resources have low utilization rates, such as during the local nighttime hours thereat; and whereby RSPs having higher user defined priorities are instructed to transmit before RSPs having lower user defined priorities.

Implementation of these rules in the context of an embodiment of the present invention is shown in FIG. 7 as follows: RSP Manager 180 becomes aware of access events and recent file system crawling for data structure and permissions relating to various data resources, as by periodic querying the various RSP. Upon become aware of such an access event relating to a data resource monitored by RSP 171, located in London which has the highest user-defined priority and for which data resource a file system crawling was recently performed, the RSP manager 180 instructs RSP 171, which monitors multiple Exchange Servers which have a relatively high real time criticality, to collect a relatively large amount of data from the data resources monitored thereby at 12:00 midnight local London time.

Thereafter, RSP Manager 180, responsive to an earlier access event relating to a data resource monitored by RSP 172 located in Paris and to an earlier file system crawl of a data resource monitored by RSP 172 which has the next-highest user-defined priority, instructs RSP 172, which monitors multiple WINDOWS® File Servers which have a slightly lower real time criticality, to collect a slightly lesser amount of data from the data resources monitored thereby at 2:00 AM local Paris time. Thereafter, RSP Manager 180, responsive to an even earlier access event relating to a data resource monitored by RSP 173 located in Rome and to an earlier file system crawl of a data resource monitored by RSP 173, instructs RSP 173, which has the third highest user-defined priority, which monitors multiple Network Attached Storage Device which have a slightly lower high real time criticality, to collect a slightly lesser amount of data from the data resources monitored thereby.

Yet thereafter, the RSP Manager 180, responsive to an even earlier access event relating to a data resource monitored by RSP 175 located in Beijing and to a yet earlier file system crawl of a data resource monitored by RSP 175, instructs RSP 175, which has the fourth-highest user-defined priority, which monitors multiple SHAREPOINT® Servers which have a slightly lower high real time criticality, to collect a similar amount of data from the data resources monitored thereby at 12:00 midnight the next day local Beijing time.

Thereafter, the RSP Manager 180, responsive to an even earlier access event relating to a data resource monitored by RSP 176 located in Delhi and to a yet earlier file system crawl of a data resource monitored by RSP 176, instructs RSP 176, which has the fifth-highest user-defined priority, which monitors multiple UNIX® File Servers which have a slightly lower high real time criticality, to collect a slightly less amount of data from the data resources monitored thereby at 12:00 midnight local Delhi time.

Thereafter, the RSP Manager 180, responsive to an even earlier access event relating to a data resource monitored by RSP 174 located in Seattle and to a yet earlier file system crawl of a data resource monitored by RSP 174, instructs RSP 174, which has the next highest user-defined priority, and which also monitors multiple UNIX® File Servers, to collect a similar amount of data from the data resources monitored thereby.

It will be appreciated by persons skilled in the art that the present invention is not limited by what has been particularly shown and described hereinabove. Rather the scope of the present invention includes both combinations and subcombinations of the various features described hereinabove as well as modifications thereof which would occur to persons skilled in the art upon reading the foregoing description and which are not in the prior art.

The invention claimed is:

1. An enterprise data collection system comprising:
at least one database for receiving over a network and storing data collected from data resources at a plurality of physical sites located at disparate locations;
a plurality of remotely synchronizable probes (RSPs) located at said plurality of physical sites, said remotely synchronizable probes (RSPs) performing:
parsing content of said data to ascertain whether there has been a change in at least one critical characteristic of said data content;
responsive to said ascertaining that there has been a change in said at least one critical characteristic of said data content, categorizing said change in said at least one critical characteristic of said data content; and
at least one of the following data collection functions:
real time event collection;
file system crawling for data structure and permissions;
data indexing;
data tagging; and
event triggered alerts; and
at least one RSP manager located remotely from at least one of said plurality of remotely synchronizable probes and being operative:
to collect at least two of the following metrics:
network aspects of said network, said network aspects comprising at least the latency of said network;
the bandwidth of said network;
time of day/day of week at each of said RSPs;
size of each of said data resources;
type of data resource of each of said data resources;
prioritization of certain ones of said data resources over other ones of said data resources; and
user defined prioritization of said data resources;
to re-prioritize the timing of performing, by each RSP of said plurality of RSPs, at least one of at least one of said data collection functions and data transmission over the timing of performing, by each other RSP of said plurality of RSPs, at least one of at least one of said data collection functions and data transmission, on the basis of said categorizing said change in said at least one critical characteristic of said data content and at least two of said metrics; and responsive to said prioritizing, to instruct each RSP of said plurality of RSPs to perform said data collection functions and data transmission to said database.

2. An enterprise data collection system according to claim 1 and wherein said at least one RSP coordinates the timing of at least some data collection functions carried out on multiple ones of said data resources, which functions may occur simultaneously.

3. An enterprise data collection system according to claim 2 and wherein said at least one RSP manager coordinates the timing of data transmission from multiple ones of said plurality of RSPs, which transmission may occur simultaneously.

4. An enterprise data collection system according to claim 3 and wherein said at least one RSP manager coordinates the timing of data transmission from multiple ones of said plurality of RSPs on the basis of at least one of the following metrics:
  network latency;
  network bandwidth;
  time of day/day of week at the RSP;
  time of day/day of week at the at least one database;
  amount of data to be transmitted;
  prioritization of certain RSPs over other RSPs; and
  user defined prioritization of data resources.

5. An enterprise data collection system according to claim 4 and wherein said prioritization of certain RSPs over other RSPs is based at least partially on characteristics of at least one of:
  real time event collection;
  file system crawling for data structure and permissions;
  data content analysis;
  data indexing;
  data tagging; and
  event triggered alerts.

6. An enterprise data collection system according to claim 1 and wherein said prioritization of certain data resources over other data resources is based at least partially on characteristics of at least one of:
  real time event collection;
  file system crawling for data structure and permissions;
  data content analysis;
  data indexing;
  data tagging; and
  event triggered alerts.

7. An enterprise data collection system according to claim 6 and wherein said at least one RSP manager coordinates the timing of data transmission from multiple ones of said plurality of RSPs, which transmission may occur simultaneously.

8. An enterprise data collection system according to claim 7 and wherein said at least one RSP manager coordinates the timing of data transmission from multiple ones of said plurality of RSPs on the basis of at least one of the following metrics:
  network latency;
  network bandwidth;
  time of day/day of week at the RSP;
  time of day/day of week at the at least one database;
  amount of data to be transmitted;
  prioritization of certain RSPs over other RSPs; and
  user defined prioritization of data resources.

9. An enterprise data collection system according to claim 8 and wherein said prioritization of certain RSPs over other RSPs is based at least partially on characteristics of at least one of:
  real time event collection;
  file system crawling for data structure and permissions;
  data content analysis;
  data indexing;
  data tagging; and
  event triggered alerts.

10. An enterprise data collection system according to claim 1 and wherein said at least one RSP manager coordinates the timing of data transmission from multiple ones of said plurality of RSPs, which transmission may occur simultaneously.

11. An enterprise data collection system according to claim 10 and wherein said at least one RSP manager coordinates the timing of data transmission from multiple ones of said plurality of RSPs on the basis of at least one of the following metrics:
  network latency;
  network bandwidth;
  time of day/day of week at the RSP;
  time of day/day of week at the at least one database;
  amount of data to be transmitted;
  prioritization of certain RSPs over other RSPs; and
  user defined prioritization of data resources.

12. An enterprise data collection system according to claim 11 and wherein said prioritization of certain RSPs over other RSPs is based at least partially on characteristics of at least one of:
  real time event collection;
  file system crawling for data structure and permissions;
  data content analysis;
  data indexing;
  data tagging; and
  event triggered alerts.

13. An enterprise data collection system according to claim 1 and wherein said at least one RSP manager is operative to collect at least three of the following metrics:
  network aspects of said network;
  time of day/day of week at each of said RSPs;
  size of each of said data resources;
  type of data resource of each of said data resources;
  prioritization of certain ones of said data resources over other ones of said data resources; and
  user defined prioritization of said data resources; and
  to prioritize the timing of performing, by each RSP of said plurality of RSPs, at least one of at least one of said data collection functions and data transmission over the timing of performing, by each other RSP of said plurality of RSPs, at least one of at least one of said data collection functions and data transmission, on the basis of at least three of said metrics.

14. An enterprise data collection system according to claim 1 and wherein said at least one RSP manager is operative to collect at least four of the following metrics:
  network aspects of said network;
  time of day/day of week at each of said RSPs;
  size of each of said data resources;
  type of data resource of each of said data resources;
  prioritization of certain ones of said data resources over other ones of said data resources; and
  user defined prioritization of said data resources; and
  to prioritize the timing of performing, by each RSP of said plurality of RSPs, at least one of at least one of said data collection functions and data transmission over the timing of performing, by each other RSP of said plurality of RSPs, at least one of at least one of said data collection functions and data transmission, on the basis of at least four of said metrics.

15. An enterprise data collection system according to claim 1 and wherein said at least one RSP manager is operative to collect at least five of the following metrics:
   network aspects of said network;
   time of day/day of week at each of said RSPs;
   size of each of said data resources;
   type of data resource of each of said data resources;
   prioritization of certain ones of said data resources over other ones of said data resources; and
   user defined prioritization of said data resources; and
   to prioritize the timing of performing, by each RSP of said plurality of RSPs, at least one of at least one of said data collection functions and data transmission over the timing of performing, by each other RSP of said plurality of RSPs, at least one of at least one of said data collection functions and data transmission, on the basis of at least five of said metrics.

16. An enterprise data collection system according to claim 1 and wherein said at least one RSP manager is operative to collect the following metrics:
   network aspects of said network;
   time of day/day of week at each of said RSPs;
   size of each of said data resources;
   type of data resource of each of said data resources;
   prioritization of certain ones of said data resources over other ones of said data resources; and
   user defined prioritization of said data resources; and
   to prioritize the timing of performing, by each RSP of said plurality of RSPs, at least one of at least one of said data collection functions and data transmission over the timing of performing, by each other RSP of said plurality of RSPs, at least one of at least one of said data collection functions and data transmission, on the basis of said metrics.

17. An enterprise data collection method comprising:
   transmitting and receiving over a network and storing data collected from data resources at a plurality of physical sites located at disparate locations;
   performing at said plurality of physical sites:
      parsing content of said data to ascertain whether there has been a change in at least one critical characteristic of said data content;
      responsive to said ascertaining that there has been a change in said at least one critical characteristic of said data content, categorizing said change in said at least one critical characteristic of said data content;
      at least one of the following data collection functions:
         real time event collection;
         file system crawling for data structure and permissions;
         data indexing;
         data tagging; and
         event triggered alerts;
   collecting at least two of the following metrics:
      network aspects of said network, said network aspects comprising at least the latency of said network and; the bandwidth of said network;
      time of day/day of week at each of said RSPs;
      size of each of said data resources;
      type of data resource of each of said data resources;
      prioritization of certain ones of said data resources over other ones of said data resources; and
      user defined prioritization of said data resources;
   re-prioritizing the timing of performing, at each of said plurality of physical sites, at least one of at least one of said data collection functions and data transmission over the timing of performing, at each other of said plurality of physical sites, at least one of at least one of said data collection functions and data transmission, on the basis of said categorizing said change in said at least one critical characteristic of said data content and at least two of said metrics; and
   responsive to said prioritizing, to perform said data collection functions and data transmission to said database, at each of said plurality of physical sites.

18. An enterprise data collection method according to claim 17 and also including coordinating the timing of at least some data collection functions carried out on multiple ones of said data resources, which functions may occur simultaneously.

19. An enterprise data collection method according to claim 18 and also comprising coordinating the timing of data transmission from multiple ones of said plurality of physical sites which transmission may occur simultaneously.

20. An enterprise data collection method according to claim 19 and wherein said coordinating the timing of data transmission from multiple ones of said plurality of physical sites is on the basis of at least one of the following metrics:
   network latency;
   network bandwidth;
   time of day/day of week at the physical site;
   time of day/day of week at the at least one database;
   amount of data to be transmitted;
   prioritization of certain physical sites over other physical sites; and
   user defined prioritization of data resources.

21. An enterprise data collection method according to claim 20 and wherein said prioritization of certain physical sites over other physical sites is based at least partially on characteristics of at least one of:
   real time event collection;
   file system crawling for data structure and permissions;
   data content analysis;
   data indexing;
   data tagging; and
   event triggered alerts.

22. An enterprise data collection method according to claim 17 and wherein said prioritization of certain data resources over other data resources is based at least partially on characteristics of at least one of:
   real time event collection;
   file system crawling for data structure and permissions;
   data content analysis;
   data indexing;
   data tagging; and
   event triggered alerts.

23. An enterprise data collection method according to claim 22 and also comprising coordinating the timing of data transmission from multiple ones of said plurality of physical sites which transmission may occur simultaneously.

24. An enterprise data collection method according to claim 23 and wherein said coordinating the timing of data transmission from multiple ones of said plurality of physical sites is on the basis of at least one of the following metrics:
   network latency;
   network bandwidth;
   time of day/day of week at the physical site;
   time of day/day of week at the at least one database;
   amount of data to be transmitted;

prioritization of certain physical sites over other physical sites; and user defined prioritization of data resources.

25. An enterprise data collection method according to claim 24 and wherein said prioritization of certain physical sites over other physical sites is based at least partially on characteristics of at least one of:

real time event collection;
file system crawling for data structure and permissions;
data content analysis;
data indexing;
data tagging; and
event triggered alerts.

26. An enterprise data collection method according to claim 17 and also comprising coordinating the timing of data transmission from multiple ones of said plurality of physical sites which transmission may occur simultaneously.

27. An enterprise data collection method according to claim 26 and wherein said coordinating the timing of data transmission from multiple ones of said plurality of physical sites is on the basis of at least one of the following metrics:

network latency;
network bandwidth;
time of day/day of week at the physical site;
time of day/day of week at the at least one database;
amount of data to be transmitted;
prioritization of certain physical sites over other physical sites; and
user defined prioritization of data resources.

28. An enterprise data collection method according to claim 27 and wherein said prioritization of certain physical sites over other physical sites is based at least partially on characteristics of at least one of:

real time event collection;
file system crawling for data structure and permissions;
data content analysis;
data indexing;
data tagging; and
event triggered alerts.

29. An enterprise data collection method according to claim 17 and comprising:

collecting at least three of the following metrics:
network aspects of said network;
time of day/day of week at each of said RSPs;
size of each of said data resources;
type of data resource of each of said data resources;
prioritization of certain ones of said data resources over other ones of said data resources; and
user defined prioritization of said data resources; and
prioritizing the timing of performing, at each of said plurality of physical sites, at least one of at least one of said data collection functions and data transmission over the timing of performing, at each other of said plurality of physical sites, at least one of at least one of said data collection functions and data transmission, on the basis of at least three of said metrics.

30. An enterprise data collection method according to claim 17 and comprising:

collecting at least four of the following metrics:
network aspects of said network;
time of day/day of week at each of said RSPs;
size of each of said data resources;
type of data resource of each of said data resources;
prioritization of certain ones of said data resources over other ones of said data resources; and
user defined prioritization of said data resources; and
prioritizing the timing of performing, at each of said plurality of physical sites, at least one of at least one of said data collection functions and data transmission over the timing of performing, at each other of said plurality of physical sites, at least one of at least one of said data collection functions and data transmission, on the basis of at least four of said metrics.

31. An enterprise data collection method according to claim 17 and comprising:

collecting at least five of the following metrics:
network aspects of said network;
time of day/day of week at each of said RSPs;
size of each of said data resources;
type of data resource of each of said data resources;
prioritization of certain ones of said data resources over other ones of said data resources; and
user defined prioritization of said data resources; and
prioritizing the timing of performing, at each of said plurality of physical sites, at least one of at least one of said data collection functions and data transmission over the timing of performing, at each other of said plurality of physical sites, at least one of at least one of said data collection functions and data transmission, on the basis of at least five of said metrics.

32. An enterprise data collection method according to claim 17 and comprising:

collecting the following metrics:
network aspects of said network;
time of day/day of week at each of said RSPs;
size of each of said data resources;
type of data resource of each of said data resources;
prioritization of certain ones of said data resources over other ones of said data resources; and
user defined prioritization of said data resources; and
prioritizing the timing of performing, at each of said plurality of physical sites, at least one of at least one of said data collection functions and data transmission over the timing of performing, at each other of said plurality of physical sites, at least one of at least one of said data collection functions and data transmission, on the basis of said metrics.

* * * * *